US009691274B2

(12) United States Patent
Shinmoto et al.

(10) Patent No.: US 9,691,274 B2
(45) Date of Patent: Jun. 27, 2017

(54) PRESSURE WAVE TRANSMISSION APPARATUS FOR DATA COMMUNICATION IN A LIQUID COMPRISING A PLURALITY OF ROTORS, PRESSURE WAVE RECEIVING APPARATUS COMPRISING A WAVEFORM CORRELATION PROCESS, PRESSURE WAVE COMMUNICATION SYSTEM AND PROGRAM PRODUCT

(71) Applicant: Japan Agency for Marine-Earth Science and Technology, Kanagawa (JP)

(72) Inventors: Yuichi Shinmoto, Yokosuka (JP); Junya Ishiwata, Yokosuka (JP); Tsuyoshi Miyazaki, Yokosuka (JP)

(73) Assignee: Japan Agency for Marine-Earth Science and Technology, Kanagawa (JP)

( * ) Notice: Subject to any disclaimer, the term of this patent is extended or adjusted under 35 U.S.C. 154(b) by 155 days.

(21) Appl. No.: 14/390,114

(22) PCT Filed: Apr. 3, 2013

(86) PCT No.: PCT/JP2013/060237
§ 371 (c)(1),
(2) Date: Oct. 2, 2014

(87) PCT Pub. No.: WO2013/151103
PCT Pub. Date: Oct. 10, 2013

(65) Prior Publication Data
US 2015/0054653 A1 Feb. 26, 2015

(30) Foreign Application Priority Data
Apr. 4, 2012 (JP) ................... 2012-085721

(51) Int. Cl.
*G08C 23/00* (2006.01)
*H04B 13/02* (2006.01)
(Continued)

(52) U.S. Cl.
CPC .............. *G08C 23/00* (2013.01); *E21B 47/12* (2013.01); *E21B 47/182* (2013.01); *H04B 13/02* (2013.01)

(58) Field of Classification Search
CPC ......... E21B 7/12; E21B 47/182; G08C 23/00; H04B 13/02
(Continued)

(56) References Cited

U.S. PATENT DOCUMENTS 3,504,164 A * 3/1970 Lachenmayer ........ G01V 1/366
340/5.61
4,210,966 A 7/1980 Ingram
(Continued)

FOREIGN PATENT DOCUMENTS

EP 0295178 A2 12/1988
EP 2230379 A2 9/2010
(Continued)

OTHER PUBLICATIONS

The supplementary partial European search report issued by the European Patent Office on Dec. 14, 2015, which corresponds to European Patent Application No. 13772547.9-1610 and is related to U.S. Appl. No. 14/390,114.
(Continued)

*Primary Examiner* — Quan-Zhen Wang
*Assistant Examiner* — Stephen Burgdorf
(74) *Attorney, Agent, or Firm* — Studebaker & Brackett PC

(57) ABSTRACT

A transmission apparatus is a transmission apparatus that generates a pressure wave for transmitting data in drilling
(Continued)

mud, and includes a tubular member, a plurality of valves that are provided side by side in an axial direction of the tubular member inside the tubular member, each of which includes a stator including holes for passing the drilling mud, and a rotatable rotor which is provided to overlap the stator and includes blocking portions blocking the holes in the stator according to a rotation position, a motor that rotates the respective rotors, and a control unit that controls the motor 130 so as to rotate and stop the respective rotors at frequencies different from each other, according to data to be transmitted.

1 Claim, 23 Drawing Sheets

(51) Int. Cl.
  *E21B 47/18* (2012.01)
  *E21B 47/12* (2012.01)
(58) Field of Classification Search
  USPC .......................................................... 340/850
  See application file for complete search history.

(56) References Cited

U.S. PATENT DOCUMENTS

| | | | |
|---|---|---|---|
| 4,414,651 A | 11/1983 | Buckner | |
| 4,839,644 A | 6/1989 | Safinya et al. | |
| 5,586,083 A * | 12/1996 | Chin | E21B 47/182 175/48 |
| 5,924,499 A | 7/1999 | Birchak et al. | |
| 7,171,309 B2 * | 1/2007 | Goodman | E21B 47/18 166/250.1 |
| 7,301,473 B2 | 11/2007 | Shah et al. | |
| 2005/0090985 A1 * | 4/2005 | Goodman | E21B 47/18 702/6 |
| 2005/0117453 A1 | 6/2005 | Lehr | |
| 2008/0181346 A1 | 7/2008 | Jang | |
| 2010/0098031 A1 * | 4/2010 | Charbit | H04J 11/0069 370/336 |
| 2010/0230113 A1 | 9/2010 | Hutin et al. | |
| 2011/0309948 A1 * | 12/2011 | Montgomery | G01V 13/00 340/853.1 |
| 2015/0330217 A1 * | 11/2015 | Liu | H04B 11/00 367/83 |

FOREIGN PATENT DOCUMENTS

| | | |
|---|---|---|
| JP | S62-284889 A | 12/1987 |
| JP | H07-057179 A | 3/1995 |
| JP | 2008-092192 A | 4/2008 |
| WO | 98/48140 A1 | 10/1998 |

OTHER PUBLICATIONS

The extended European search report issued by the European Patent Office on Mar. 24, 2016, which corresponds to European Patent Application No. 13772547.9-1610 and is related to U.S. Appl. No. 14/390,114.

Shinmoto Y. et al.; "Numerical Analysis and Experimental Study of Fluid Return Pressure for Mud-Pulse Telemetry"; 2011 IEEE 3rd International Conference on Communication Software and Networks (ICCSN); May 27-29, 2011, pp. 273-277.

"Cracking the carbonate code"; Middle East & Asia reservoir Review; No. 2; 2001.

Notification of Transmittal of Translation of the International Preliminary Report on Patentability and Translation of Written Opinion of the International Searching Authority; PCT/JP2013/060237 issued on Oct. 16, 2014.

* cited by examiner

Fig. 3

| SYMBOL | UPPER STAGE OPENING AND CLOSING RATIO (%) | MIDDLE STAGE OPENING AND CLOSING RATIO (%) | LOWER STAGE OPENING AND CLOSING RATIO (%) |
|---|---|---|---|
| 0000 | 100 | 100 | 100 |
| 0001 | 100 | 100 | 50 |
| 0010 | 100 | 100 | 0 |
| 0011 | 100 | 100 | -50 |
| 0100 | 100 | 50 | 100 |
| 0101 | 100 | 50 | 50 |
| 0110 | 100 | 50 | 0 |
| 0111 | 100 | 50 | -50 |
| 1000 | 100 | 0 | 100 |
| 1001 | 100 | 0 | 50 |
| 1010 | 100 | 0 | 0 |
| 1011 | 100 | 0 | -50 |
| 1100 | 100 | -50 | 100 |
| 1101 | 100 | -50 | 50 |
| 1110 | 100 | -50 | 0 |
| 1111 | 100 | -50 | -50 |

*Fig.16*

| | f(t)=[ | A, | D, | C, | B | ] | TIMING |
|---|---|---|---|---|---|---|---|
| $R_1^1(t)=A$ | | 10, | 5, | 3, | 2 | | $=C_1^1(t)$ |
| $R_1^2(t)=B$ | | 4, | 7, | 1, | 8 | | $=C_1^2(t)$ |
| $R_1^3(t)=C$ | | 12, | 4, | 14, | 9 | | $=C_1^3(t)$ |
| $R_1^4(t)=D$ | | 3, | 11, | 6, | 2 | | $=C_1^4(t)$ |

| $f(t)=[$ | A, | D, | C, | B | ] | TIMING |
|---|---|---|---|---|---|---|
| $R_1^1(t)=A$ | 10, | 5, | 3, | 2 | | $=C_1^1(t)$ |
| $R_1^2(t)=B$ | 4, | 7, | 1, | 8 | | $=C_1^2(t)$ |
| $R_1^3(t)=C$ | 12, | 4, | 14, | 9 | | $=C_1^3(t)$ |
| $R_1^4(t)=D$ | 3, | 11, | 6, | 2 | | $=C_1^4(t)$ |
| | $C_1^1(k)$ | $C_1^2(k)$ | $C_1^3(k)$ | $C_1^4(k)$ | | WAVEFORM PATTERN k |

(b)

| | A, | B, | C, | D | TIMING |
|---|---|---|---|---|---|
| $R_1^1(t)=A$ | 10, | 2, | 3, | 5 | |
| $R_1^2(t)=B$ | 4, | 9, | 1, | 7 | |
| $R_1^3(t)=C$ | 12, | 8, | 14, | 4 | |
| $R_1^4(t)=D$ | 3, | 2, | 6, | 11 | |
| | $R_2^1(k)$ | $R_2^2(k)$ | $R_2^3(k)$ | $R_2^4(k)$ | WAVEFORM PATTERN k |

SECONDARY REFERENCE WAVEFORM

| $f(t)=[$ | A, | D, | C, | B | ] |
|---|---|---|---|---|---|
| $R_1^1(t)=A$ | 10, | 5, | 3, | 2 | $=C_1^1(t)$ |
| $R_1^2(t)=B$ | 4, | 7, | 1, | 8 | $=C_1^2(t)$ |
| $R_1^3(t)=C$ | 12, | 4, | 14, | 9 | $=C_1^3(t)$ |
| $R_1^4(t)=D$ | 3, | 11, | 6, | 2 | $=C_1^4(t)$ |
| | $C_1^1(k)$ | $C_1^2(k)$ | $C_1^3(k)$ | $C_1^4(k)$ | PRIMARY CORRELATION PROCESS WAVEFORM AFTER TRANSPOSITION |

(b)

| | A, | B, | C, | D | |
|---|---|---|---|---|---|
| $R_1^1(t)=A$ | 10, | 2, | 3, | 5 | |
| $R_1^2(t)=B$ | 4, | 9, | 1, | 7 | |
| $R_1^3(t)=C$ | 12, | 8, | 14, | 4 | SECONDARY REFERENCE WAVEFORM |
| $R_1^4(t)=D$ | 3, | 2, | 6, | 11 | |
| | $R_2^1(k)$ | $R_2^2(k)$ | $R_2^3(k)$ | $R_2^4(k)$ | |
| | $J^1(1)$ | $J^1(2)$ | $J^1(3)$ | $J^1(4)$ | |

*Fig.20*

| f(t)=[ | A, | D, | C, | B | ] | TIMING |
|---|---|---|---|---|---|---|
| $R_1^1(t)$= I | 7, | 2, | 7, | 6 | | =$C_1^1(t)$ |
| $R_1^2(t)$= II | 10, | 4, | 8, | 1 | | =$C_1^2(t)$ |
| $R_1^3(t)$= III | 13, | 2, | 1, | 5 | | =$C_1^3(t)$ |
| $R_1^4(t)$= IV | 6, | 7, | 3, | 10 | | =$C_1^4(t)$ |

| $f(t)=[$ | A, | D, | C, | B | ] |
|---|---|---|---|---|---|
| $R_1^1(t)=$ I | 7, | 2, | 7, | 6 | $=C_1^1(t)$ |
| $R_1^2(t)=$ II | 10, | 4, | 8, | 1 | $=C_1^2(t)$ |
| $R_1^3(t)=$ III | 13, | 2, | 1, | 5 | $=C_1^3(t)$ |
| $R_1^4(t)=$ IV | 6, | 7, | 3, | 10 | $=C_1^4(t)$ |
| | $C_1^1(k)$ | $C_1^2(k)$ | $C_1^3(k)$ | $C_1^4(k)$ | |

(b)

| | A, | B, | C, | D |
|---|---|---|---|---|
| $R_1^1(t)=$ I | 7, | 6, | 7, | 2 |
| $R_1^2(t)=$ II | 10, | 1, | 8, | 4 |
| $R_1^3(t)=$ III | 13, | 5, | 1, | 2 |
| $R_1^4(t)=$ IV | 6, | 10, | 3, | 7 |
| | $R_2^1(k)$ | $R_2^2(k)$ | $R_2^3(k)$ | $R_2^4(k)$ |

PRESSURE WAVE TRANSMISSION APPARATUS FOR DATA COMMUNICATION IN A LIQUID COMPRISING A PLURALITY OF ROTORS, PRESSURE WAVE RECEIVING APPARATUS COMPRISING A WAVEFORM CORRELATION PROCESS, PRESSURE WAVE COMMUNICATION SYSTEM AND PROGRAM PRODUCT

TECHNICAL FIELD

The present invention relates to a transmission apparatus, a reception apparatus, a transmission/reception system, and a reception program, which generates pressure waves in liquid to perform data transmission.

BACKGROUND ART

In the related art, there has been a technology called MWD (Measurement While Drilling) for measuring information regarding the inside of a drilled hole in real time, as an important technology in resource drilling for petroleum or the like and scientific drilling MWD uses a transmission technology that generates back pressure (pressure against the direction opposite to a circulation flow) called mud pulses (drilling mud pressure waves) and uses the phase difference and the frequency difference between the pressure waveforms (for example, see Patent Literature 1)

CITATION LIST

Patent Literature

[Patent Literature 1] Japanese Unexamined Patent Application Publication No. 62-284889

SUMMARY OF INVENTION

Technical Problem

In data transmission by a mud pulse, pressure waves are generated by momentarily blocking a flow in a hole near the bottom, and signals are transmitted up to the ground separated by several thousands of meters. However, a transmitter using the mud pulse in the related art cannot transmit a sufficient amount of information. For example, the transmission speed is about one bit per second (bps) in a system using the opening and closing of a valve, and is about 3 bps to 16 bps in a continuous wave system using the rotation of a rotor blade.

The present invention has been made in view of the above problems, and an object of the present invention is to provide a transmission apparatus, a reception apparatus, a transmission/reception system, and a reception program which are capable of transmitting a larger amount of information, in data transmission by liquid, using a mud pulse.

Solution to Problem

In order to achieve the above object, a transmission apparatus according to an embodiment of the present invention is a transmission apparatus that generates a pressure wave for transmitting data in liquid, including: a tubular member; a plurality of valves that are provided side by side in an axial direction of the tubular member inside the tubular member, each of which includes a stator including holes for passing liquid, and a rotatable rotor which is provided to overlap the stator and includes blocking portions blocking the holes in the stator according to a rotation position; drive means for rotating the respective rotors; and control means for controlling the drive means so as to rotate and stop the respective rotors at frequencies different from each other, according to data to be transmitted.

In the transmission apparatus according to an embodiment of the present invention, a plurality of valves are rotated and stopped at different frequencies, thereby generating pressure waves at respective frequencies. Therefore, according to the transmission apparatus according to an embodiment of the present invention, a larger amount of information can be contained in the pressure waves which are used as carriers of data, and a larger amount of information can be transmitted, in the data transmission through the liquid, using mud pulses.

The transmission apparatus may further include a sensor that detects a predetermined physical quantity as the data to be transmitted. According to this configuration, it is possible to appropriately transmit, for example, physical quantities such as an electrical resistance value and the density in a drilled hole.

The transmission apparatus may further include a pressure-resistant container that accommodates the drive means farther on the outer side of a valve provided on one end side, among the plurality of valves that are provided side by side; and a shaft that is provided along the axial direction of the tubular member, and connected to the respective rotors and the drive means so as to independently transmit a rotational force from the drive means to the respective rotors. According to this configuration, it is possible to reliably configure the transmission apparatus according to an embodiment of the present invention. Further, since one pressure-resistant container provided in the transmission apparatus is required, a possibility of blocking a flow path of the liquid is low.

The transmission apparatus may further include a plurality of pressure-resistant containers that accommodate the drive means which is provided for each of the plurality of valves in the vicinity of each of the plurality of valves; and a plurality of shafts that are provided in the axial direction of the tubular member and connected to the rotors so as to transmit a rotational force from the drive means to the rotors. According to the configuration, it is possible to reliably configure the transmission apparatus according to an embodiment of the present invention. Further, the drive means is provided for each valve, thereby being easily realized.

A reception apparatus according to an embodiment of the present invention includes storage means for storing information indicating a plurality of reference waveforms and information in which information to be extracted and a set of reference correlation values indicating reference correlations of the number of the reference waveforms are associated; waveform detection means for detecting a measured waveform by detecting pressures generated in liquid in time series; first correlation value calculation means for calculating a first correlation value indicating a correlation between the measured waveform detected by the waveform detection means and each of the plurality of reference waveforms indicated by information stored in the storage means; second correlation value calculation means for calculating a second correlation value indicating a correlation between a set of the first correlation values calculated by the first correlation value calculation means and a set of the reference correlation values indicated by information stored by the storage means; information determination means for determining information to be extracted from the measured waveform detected by the waveform detection means, from the second correlation value calculated by the second correlation value calculation means, and the information to be extracted and the set of the reference correlation values stored by the storage means; and output means for outputting information determined by the information determination means.

In the transmission apparatus according to the embodiment of the present invention, since the carrier propagates in the liquid, the carrier cannot be a carrier of a high frequency as in wireless communication. Accordingly, since respective reference waveforms are similar, a sharp peak in each correlation function value is not obtained. Therefore, it is difficult to appropriately extract information by the simple sliding correlation which extracts information only from the correlation value between the measured waveform and the reference waveform. In the reception apparatus according to the embodiment of the present invention, the second correlation value with the set of values indicating the reference correlation is calculated based on the first correlation value with the reference waveform of the measured waveform, and the information extracted from the measured waveform (received information) is determined based on the second correlation value. Therefore, as compared to a case of using only the correlation value (first correlation value) between the measured waveform and the reference waveform, it is possible to further extract the information from the measured waveform appropriately.

The storage means may store information in which a plurality of sets of reference correlation values and the information to be extracted are associated, the second correlation value calculation means may calculate a second correlation value between a set of first correlation values and the plurality of sets of reference correlation values, and the information determination means may determine information to be extracted from the second correlation values of the plurality of sets of reference correlation values associated with the information to be extracted. According to the configuration, since a plurality of values indicating reference correlation is associated with the information to be extracted and one piece of information is extracted from a plurality of second correlation values, it is possible to extract further information from the measured waveform appropriately.

The storage means may hierarchically store a set of reference correlation values associated with the information to be extracted, and the second correlation value calculation means may calculate a second correlation value by calculating a correlation value indicating a correlation between a set of first correlation values calculated by the first correlation value calculation means and a set of reference correlation values of a bottom layer indicated by information stored by the storage means, and calculating correlation values a number of times according to the number of layers, using the calculated correlation value and a set of reference correlation values of the subsequent layers. It is possible to perform reception that is more resistant to noise by this configuration.

Further, a transmission/reception system according to an embodiment of the present invention is configured to include the transmission apparatus according to the embodiment of the present invention and the reception apparatus according to the embodiment of the present invention.

However, the present invention can also be described as an invention of a reception program as follows, as well as the invention of the reception apparatus as described above. The reception program and the reception apparatus belong to different categories, but are substantially the same invention, and thus the same action and effect are achieved.

In other words, the reception program according to an embodiment of the present invention causes a computer to function as: storage means for storing information indicating a plurality of reference waveforms and information in which information to be extracted and a set of reference correlation values indicating reference correlations of the number of the reference waveforms are associated; waveform detection means for detecting a measured waveform by detecting pressures generated in liquid in time series; first correlation value calculation means for calculating a first correlation value indicating a correlation between the measured waveform detected by the waveform detection means and each of the plurality of reference waveforms indicated by information stored in the storage means; second correlation value calculation means for calculating a second correlation value indicating a correlation between a set of the first correlation values calculated by the first correlation value calculation means and a set of the reference correlation values indicated by information stored by the storage means; information determination means for determining information to be extracted from the measured waveform detected by the waveform detection means, from the second correlation value calculated by the second correlation value calculation means and, the information to be extracted and the set of the reference correlation values stored by the storage means; and output means for outputting information determined by the information determination means.

Advantageous Effects of Invention

According to an embodiment of the present invention, a plurality of valves are rotated and stopped at different frequencies, thereby generating pressure waves at respective frequencies. Therefore, according to an embodiment of the present invention, a larger amount of information can be contained in the pressure waves which are used as carriers of data, and a larger amount of information can be transmitted, in the data transmission through the liquid, using mud pulses.

BRIEF DESCRIPTION OF DRAWINGS

FIG. 3 is a diagram illustrating a correspondence relationship between bit patterns (symbols) and states of valves (opening and closing ratios) stored in the transmission apparatus.

FIG. 16 is a diagram illustrating a correlation function (first correlation value) of a simple process example in the reception apparatus.

FIG. 17 is a diagram illustrating reference waveforms (sets of reference correlation values) of a simple process example in the reception apparatus.

FIG. 18 is a diagram illustrating correlation coefficients (second correlation values) between correlation functions and reference waveforms of a simple process example in the reception apparatus.

FIG. 20 is a diagram illustrating a correlation function (first correlation value) in a case of performing an integration of a simple process in the reception apparatus.

FIG. 21 is a diagram illustrating reference waveforms (sets of reference correlation values) in a case of performing an integration of a simple process in the reception apparatus.

DESCRIPTION OF EMBODIMENTS

Figure 1:
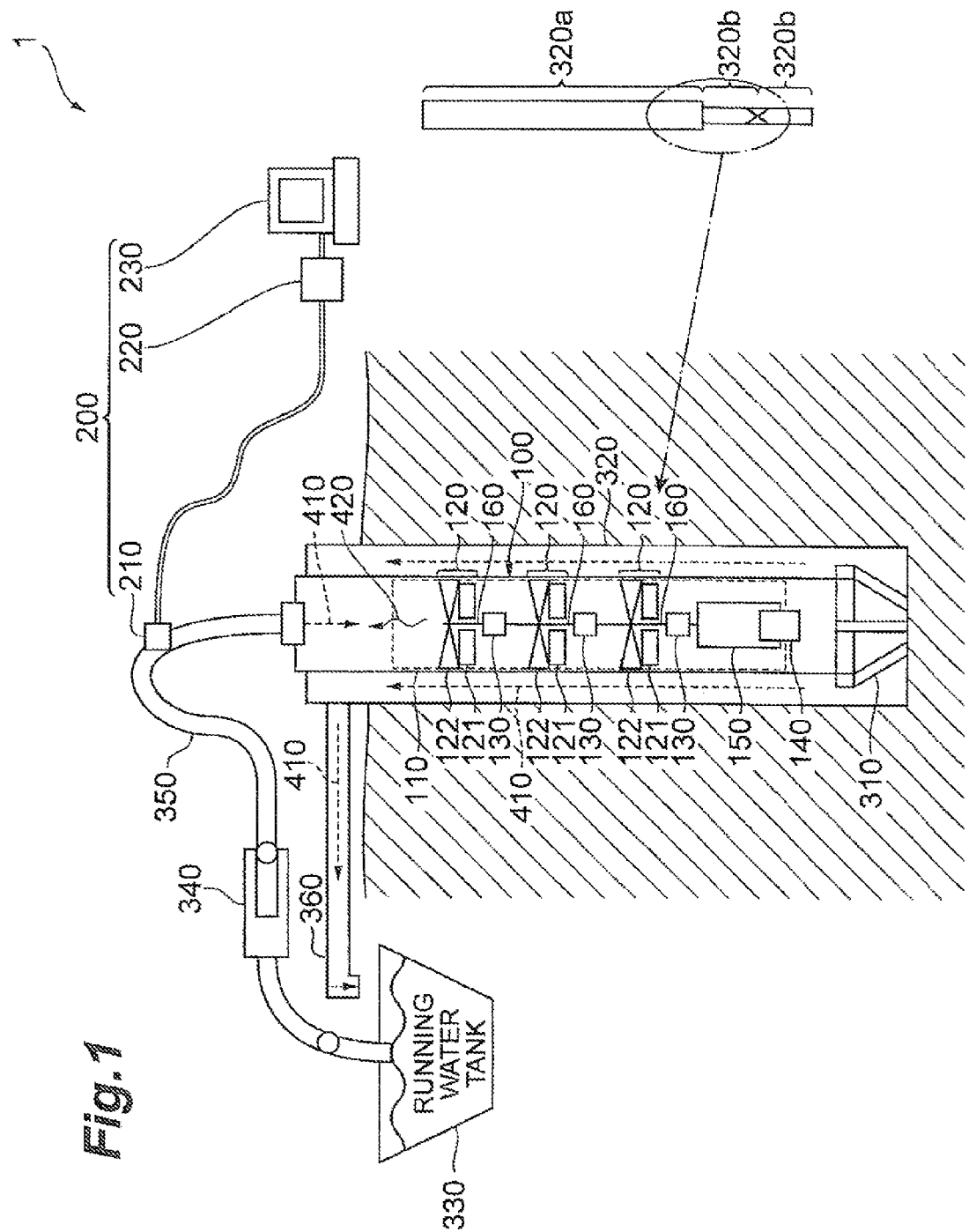
FIG. 1 is a diagram illustrating the configurations of a transmission apparatus, a reception apparatus, and a transmission/reception system configured to include the transmission apparatus and the reception apparatus according to an embodiment of the present invention.

Below, the embodiments of a transmission apparatus, a reception apparatus, a reception system, and a reception program according to the present invention will be described in detail in conjunction with the drawings. In addition, since the same reference numerals denote the same elements in the description of the drawings, redundant description will be omitted.

FIG. 1 is a diagram illustrating a transmission apparatus 100, a reception apparatus 200, and a transmission/reception system 1 configured to include the transmission apparatus 100 and the reception apparatus 200, according to an embodiment of the present invention. The transmission/reception system 1 is a system that transmits data by generating a pressure wave in liquid. The transmission/reception system 1 is used to transmit bottom-hole data of a point being drilled into the ground or the shipboard when the seafloor or the earth's crust is drilled, for example, as illustrated in FIG. 1.

Drilling is performed by a drill bit 310. A pipe (casing) 320 is provided in a hole which has been drilled in the seafloor or the earth's crust by the drill bit 310. Considering the pipe 320, a pipe 320a having a large diameter is used on the side closer to the seafloor or the bottom of the earth, and a pipe 320b having a small diameter is used on the side closer to the drill bit 310. The pipe 320 may have a length of several thousands of meters depending on the depth of the drilling. Drilling mud (mud) 410, which is liquid provided in advance in a running water tank 330, is flowed into the pipe 320 through a flow path (stand pipe) 350 connecting the running water tank 330 and the pipe 320, by the circulating pump 340. The flowed drilling mud 410 and the debris caused by the drilling by the drill bit 310 are sucked in by the suction 360 and conveyed into the ground or the shipboard.

In the present embodiment, a pressure wave (a mud pulse, or a back pressure) 420 is generated in the drilling mud, and data transmission is performed through the pressure wave. For example, in the present embodiment, the physical quantities such as the orientation, inclination, tool face (direction of the drill bit 310), load, torque, temperature, and pressure of a point which is being drilled during drilling are measured, and the measured data is transmitted to the ground or the shipboard in real time using the pressure wave. This technology is called MWD.

Subsequently, the transmission apparatus 100 according to the present embodiment will be described. The transmission apparatus 100 is an apparatus that generates a pressure wave 420 for transmitting data in the flow of the drilling mud 410. The transmission apparatus 100, the transmission apparatus 100 is configured to include a tubular member 110, a plurality of valves (modulators) 120 and motors 130, a sensor 140, and a control unit 150.

The tubular member 110 is a member (drill pipe) that is provided on the inside of the pipe 320, and accommodates the main components of the transmission apparatus 100. The tubular member 110 is formed of, for example, a steel tube. The tubular member 110 is connected to the flow path 350 in an opening portion on the side (ground side or shipboard side) opposite to the drill bit 310, and the drilling mud 410 flows to the tubular member 110 from the flow path 350. The drilling mud 410 that has been flowed to the tubular member 110 flows out from the opening portion on the drill bit 310 side of the tubular member 110, and flows between the pipe 320 and the tubular member 110 to return to the ground or the shipboard. In addition, the drill pipe provided on the inside of the pipe 320 has a length of several thousands of meters depending on the depth of drilling, but the tubular member 110 according to the present embodiment may have a length sufficient for housing the following components.

Three valves 120 are members which are provided on the inside of the tubular member 110 and generate pressure waves 420 for transmitting data in the flow of the drilling mud 410. The valves 120 are provided side by side in an axial direction of the tubular member 110. One valve 120 is configured with a stator 121 and a rotor 122 which are provided so as to overlap each other. The stator 121 is a member with a flat plate (disc) shape, and is fixed to the tubular member 110 so as to block the drilling mud 410 flowed into the tubular member 110. Holes for passing the drilling mud 410 are provided in the stator 121.

The rotor 122 is a member with a flat plate (disc) shape, and is provided on the inside the tubular member 110 and is rotatable, with the axial direction of the tubular member 110 as a rotation axis. The rotor 122 has blocking portions (blades) for blocking the holes of the stator 121 according to the rotational position. The blocking portions have a shape corresponding to the holes of the stator 121.

Figure 2:
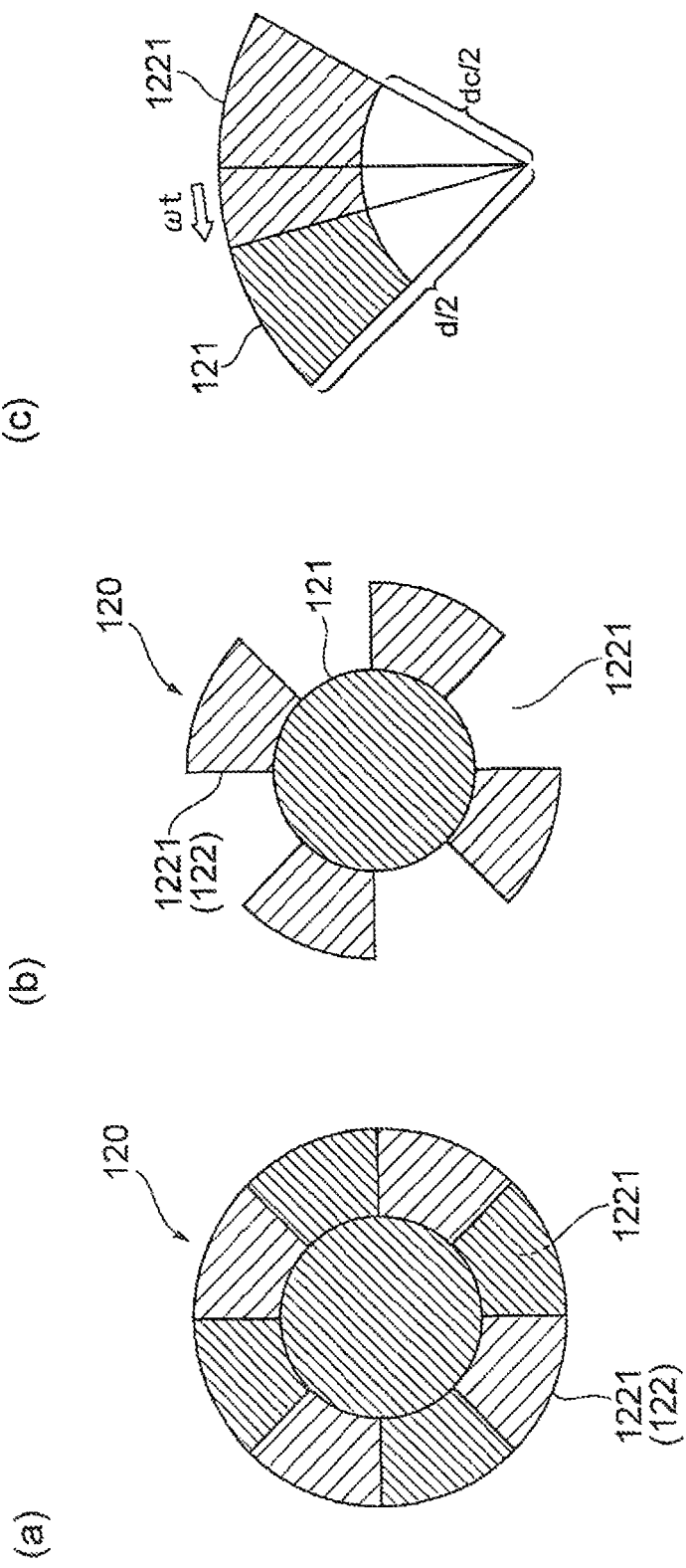
FIG. 2 is a diagram illustrating a valve as viewed from an axial direction of a tubular member.

FIG. 2 illustrates a valve 120 as viewed from the axial direction of the tubular member 110. As illustrated in FIG. 2, the hole 1211 of the stator 121 has a shape of, for example, a fan shape spreading in a radial direction (arc shape having a width in the radial direction), and four holes uniformly provided in the circumferential direction of the stator 121. Further, when viewed in the axial direction of the tubular member 110, the blocking portions 1221 of the rotor 122 are provided in the same positions of the holes 1211 of the stator 121 and have the same shapes. Four blocking portions 1221 are uniformly provided in the circumferential direction of the stator 121. As illustrated in FIG. 2(a), if the blocking portions 1221 of the rotor 122 are located on the holes 1211 of the stator 121, the drilling mud that has been flowed into the tubular member 110 is blocked. Meanwhile, as illustrated in FIG. 2(b), if the blocking portions 1221 of the rotor 122 are not located on the holes 1211 of the stator 121, the drilling mud 410 that has been flowed into the tubular member 110 can flow through the holes 1211 of the stator 121.

As described above, the blocking portion 1221 of the rotor 122 blocks the hole 1211 of the stator 121 in order to generate the pressure wave 420. The rotor 122 is connected to the shaft 160, which transmits a rotational force and is a rotational axis, and is rotated or stopped by the motor 130 receiving control from the control unit 150 through the shaft 160. The shaft 160 is a member which is provided along the axial direction of the tubular member 110 and is connected to the rotor 122 and the motor 130 so as to transmit the rotational force from the motor 130 to the rotor 122. As described below, the respective rotors 122 of the respective valves 120 are rotated at frequencies which are different from each other. In addition, in FIG. 1, the stator 121 and the rotor 122 overlap each other while the stator 121 lies on the lower side (drill bit 310 side) and the rotor 122 lies on the upper side (ground side or shipboard side), but the stator 121 and the rotor 122 may overlap in a reversed positional relationship.

The motor 130 is drive means which is connected to the shaft 160 and rotates the respective rotors 122 by rotating the shaft 160. The motor 130 receives control from the control unit 150 so as to rotate the rotor 122. For example, a pulse motor can be used as the motor 130. Further, the motor 130 is accommodated in the pressure-resistant container as described below.

The sensor 140 is a sensor that detects predetermined physical quantities as data to be transmitted from the transmission apparatus 100. The sensor 140 is disposed immediately above the drill bit, for example, in a state shown in FIG. 1. The sensor 140 measures (detects) the physical quantities such as the orientation, inclination, tool face (direction of the drill bit 310), load, torque, temperature, and pressure at the position. In addition, an existing sensor capable of measuring the above-described physical quantities can be used as the sensor 140. In a case of measuring a plurality of physical quantities of different types, a plurality of sensors 140 corresponding thereto may be used. The sensor 140 is connected to the control unit 150 through a cable or the like, and outputs the data indicating the measured physical quantities to the control unit 150 through the cable.

The control unit 150 is control means for controlling the motor 130 so as to rotate and stop the respective rotors 122 at the frequencies different from each other, according to data to be transmitted. The control unit 150 is realized by an electronic board including a CPU (Central Processing Unit) and a memory, and a power supply (battery) for supplying power to the electronic board and the motor 130, and specifically has the following functions.

The frequencies of the respective rotors 122 are set in advance. For example, the respective valves 120 which are arranged in order from the ground side or the shipboard side are considered to be an upper stage, a middle stage, and a lower stage. The upper stage rotates at 12 Hz (since there are four holes 1211 of the stator 121, the rotor 122 rotates three times per second), the middle stage rotates at 8 Hz (similarly, the rotor 122 rotates two times per second), and the lower stage rotates at 4 Hz (similarly, the rotor 122 rotates one time per second).

The control unit 150 inputs data to be transmitted by inputting, for example, the measured data (strata logging data) from the sensor 140. The control unit 150 converts the input data into binary data (bit stream) such as "101001 . . . ". The control unit 150 divides the binary data into units of the number of input bits so as to form a 1, 0 pattern (bit pattern). In addition, the number of input bits is a number that is set in advance and stored in the control unit 150, and is a numeric value of, for example, 4 (bits) (in this case, the bit pattern is a bit stream of four digits). Next, the control unit 150 determines rotation control parameters according to the bit pattern, and controls the motor 130 according to the rotation control parameters so as to rotate or stop the rotor 122 of the valve 120 of the multi-stage (starts the modulation).

Specifically, the control unit 150 stores information indicating the correspondence relationship between the bit pattern and the state of the rotor 122 of the valve 120 of the multi-stage in advance as illustrated in FIG. 3. The information is created in advance, for example, by the administrator of the transmission/reception system 1 and is input to the control unit 150. The column of the "symbol" in FIG. 3 corresponds to the bit pattern. Further, the opening and closing ratio (%) of the upper stage, the opening and closing ratio (%) of the middle stage, and the opening and closing ratio (%) of the lower stage indicate the states of rotors 122 of the respective valves 120.

The opening and closing ratio (%) of 100(%) corresponds a state in which the blocking portion 1221 of the rotor 122 does not maximally block the hole 1211 of the stator 121 (the most opened state, for example, a state shown in FIG. 2(b)). The opening and closing ratio (%) of 0(%) corresponds a state in which the blocking portion 1221 of the rotor 122 maximally blocks the hole 1211 of the stator 121 (for example, a state shown in FIG. 2(a)). The opening and closing ratio (%) of 50(%) corresponds to a blocking state of 50% of the state in which the blocking portion 1221 of the rotor 122 does not maximally block the hole 1211 of the stator 121, and corresponds to a state of being further blocked with the passage of time (blocking is not finished). The opening and closing ratio (%) of −50(%) corresponds a blocking state of 50% of the state in which the blocking portion 1221 of the rotor 122 does not maximally block the hole 1211 of the stator 121, and corresponds to a state of being further opened with the passage of time (opening is not finished).

The control unit 150 determines a symbol in FIG. 3 to which the bit pattern to be transmitted corresponds, and controls the rotors 122 such that the respective valves 120 are in a state with the aperture ratio associated with the same symbol as the bit pattern to be transmitted. Specifically, the rotation of the rotor 122 is stopped to be in a state of the aperture ratio. The length for stopping the rotation of the rotor 122 is determined by the frequency of the rotation or a time interval for transmitting one piece of information, and is several tens of milli-seconds in the example of the present embodiment.

Figure 4:
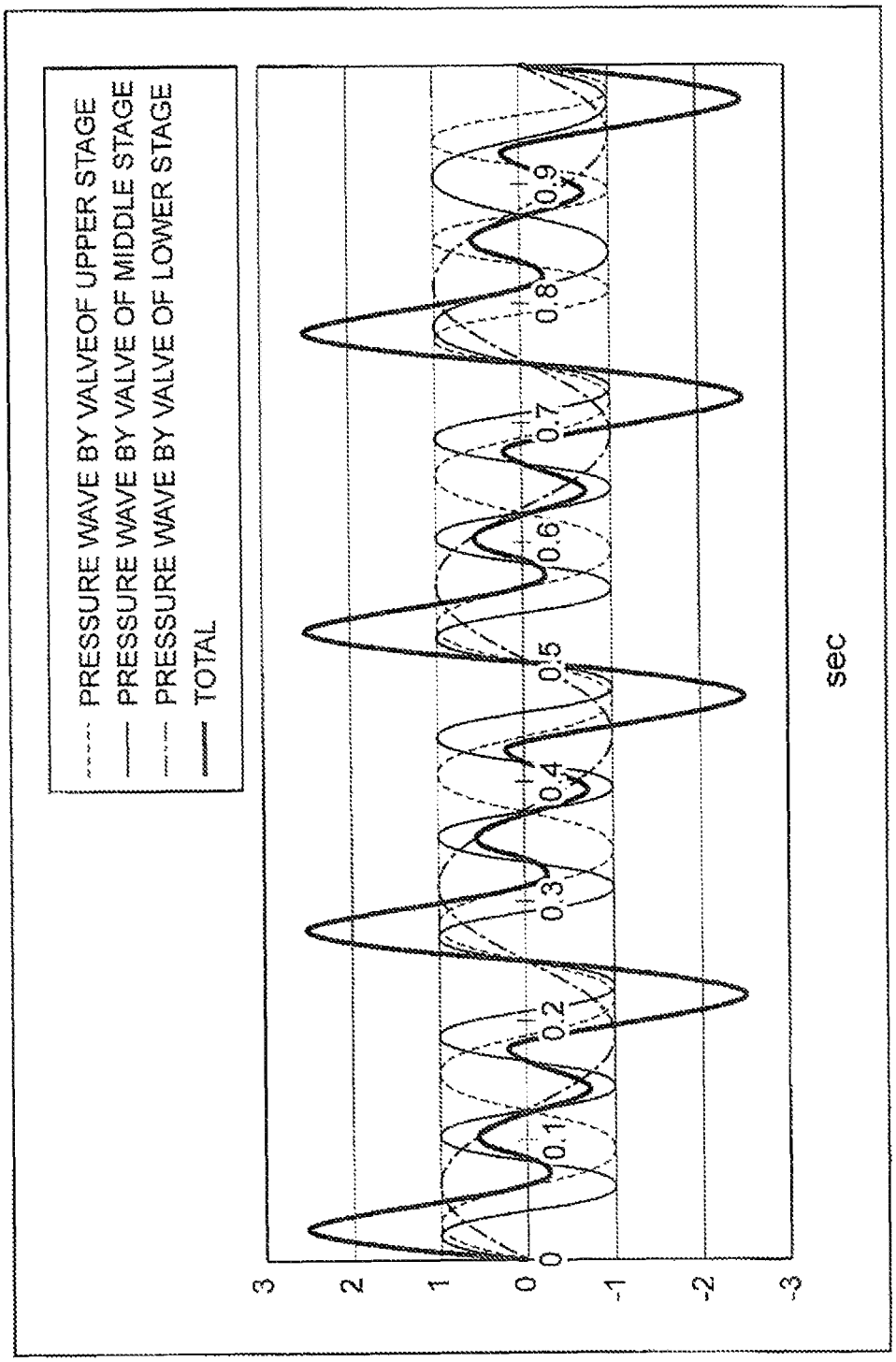
FIG. 4 is a graph illustrating pressure waves (waveforms) generated by the transmission apparatus.

The pressure waves are generated from the respective valves 120 by the control of the control unit 150. As illustrated in the graph of FIG. 4, the pressure waves are generated for the respective valves 120 of the respective stages, and the waveform according to the rotation frequency is formed. In addition, the horizontal axis of the graph of FIG. 4 denotes the timing (time), and the vertical axis denotes the magnitudes of the pressures of the pressure waves. A total composite wave is formed by the pressure waves of the respective stages being synthesized (summed). The composite wave is the pressure wave 420 for transmitting data. By using the method, data is transmitted while being superimposed on the composite wave. In other words, information is carried on the shape of the pressure wave which varies with the frequency and phase of the valve 120 of each stage. Accordingly, the shape is formed by setting the frequency and the phase at each stage. The time length T of the shape is a repetition period of the waveform on which the information is carried. The phase varies for each period T which is the length of the shape of one waveform, and thus it is possible to transmit a different waveform at a period of T. One waveform I(t) of a certain stage i having information is expressed as follows:

$$I_i(t) = A \cdot \sin(2\pi f_i t + \phi_i)$$ [Equation 1]

Here, A indicates a pressure, f indicates a frequency, $\phi$ indicates a phase, and t indicates a time. Further, the length of the waveform I(t) is T (in other words, t=0 to T).

Then, the pressure waves P that are modulated by the valves 120 of the multi-stage are expressed as follows, using the number of stages N since the pressure waves P is the composite pressure wave of the respective valves 120.

$$P(t) = \sum_{i=1}^{N} I_i(t)$$ [Equation 2]

Figure 5:
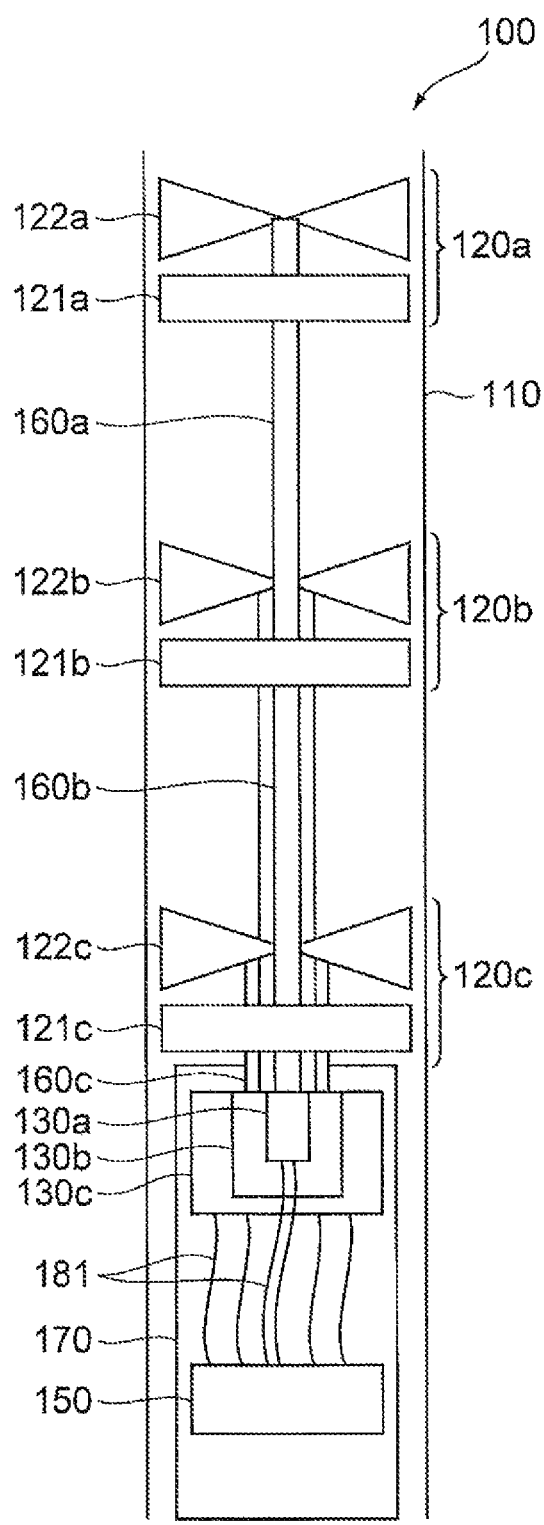
FIG. 5 is a diagram illustrating an example of the structures (arrangements) of a valve, a motor, and the like of the transmission apparatus.

Here, the structures (arrangements) of the valve 120, the motor 130, and the like of the transmission apparatus 100 will be described in more detail. The structure of using a hollow pulse motor as the motor 130 is illustrated in FIG. 5. As illustrated in FIG. 5, the respective shafts 160a, 160b, and 160c are connected to the rotors 122a, 122b, and 122c of the respective valves 120a, 120b, and 120c. The shaft 160b connected to the rotor 122b of the middle stage is hollow (tubular) as illustrated in FIG. 5 for accommodating the shaft 160a connected to the rotor 122a of the upper stage. The shaft 160c connected to the rotor 122c of the lower stage is hollow (tubular) similarly for accommodating the shaft 160b connected to the rotor 122b of the middle stage. By using such a configuration, the respective shafts 160a, 160b, and 160c can rotate independently of the separate shafts 160a, 160b, and 160c, and can transmit rotational force independently of each other to the rotors 122a, 122b, and 122c.

The respective shafts 160a, 160b, and 160c are connected to the respective separate motors 130a, 130b, and 130c, and rotated by the respective motors 130a, 130b, and 130c. Among three motors 130a, 130b, and 130c, hollow pulse motors are used as the motors 130b and 130c. As illustrated in FIG. 5, the motor 130a is disposed in the hollow portion of the motor 130b and the motor 130c is disposed in the hollow portion of the motor 130c. In addition, such a small motor as to be able to be disposed in the hollow portion of the motor 130b may be used as the motor 130a. The motors 130a, 130b, and 130c grouped in this manner are disposed farther on the outer side of the valve 120c that is provided on one end side (lower side) of the plurality of valves 120a, 120b, and 120c.

The motors 130a, 130b, and 130c, and the control unit 150 which is provided farther on the outer side the motors 130a, 130b, and 130c are accommodated in a pressure-resistant container (housing container) 170 disposed farther on the outer side of the valve 120c of the lower stage. Containers having a generally used configuration can be used as the pressure-resistant container 170. The respective motors 130a, 130b, and 130c and the control unit 150 are connected by, for example, a cable 181 on the inside of the pressure-resistant container 170, and the supply of power and control is performed though the cable 181. Further, the portion in the pressure-resistant container 170 for passing the shafts 160a, 160b, and 160c is sealed so as to prevent liquid from leaking from the inside to the outside, and vice versa.

According to this configuration, it is possible to reliably configure the transmission apparatus 100 according to the embodiment. Further, since a single pressure-resistant container 170 is provided in the transmission apparatus 100, space-saving can be realized and the possibility of blocking the flow path of the liquid such as drilling mud 410 is low.

Figure 6:
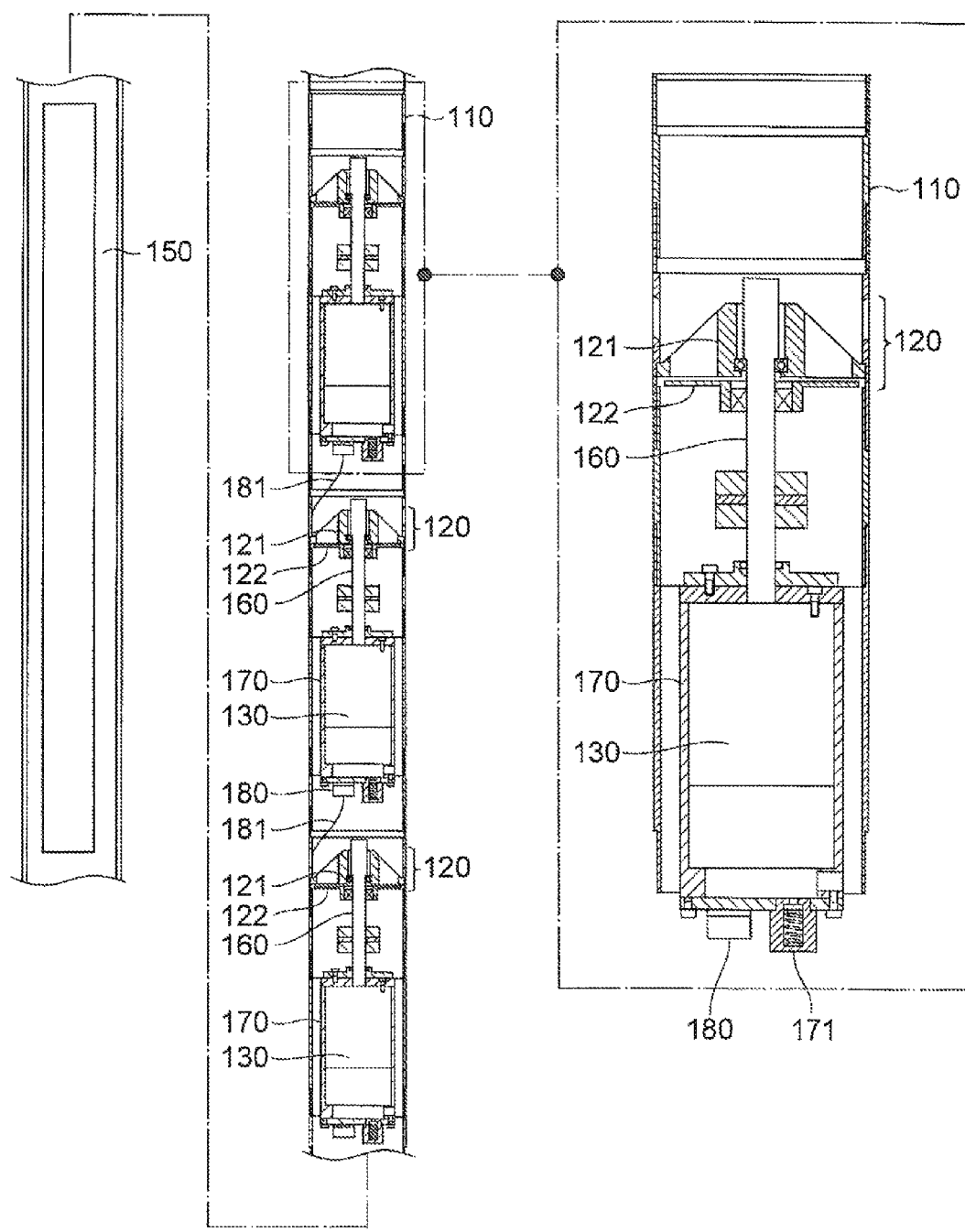
FIG. 6 is a diagram illustrating another example of the structures (arrangements) of the valve, the motor, and the like of the transmission apparatus.

FIG. 6 illustrates a structure in which the motors 130 (pulse motors) are connected in series and wired to an outer container housing the control unit 150. In the configuration, each separate motor 130 is fixed and disposed in the vicinity of the lower stage side of the rotor 122 of each valve 120. The motor 130 is provided in the inside of each pressure-resistant container (housing container) 170 provided in the vicinity of the valve 120 according to the position of the motor 130. The pressure-resistant container 170 is a pressure equalization mechanism in oil, and a pressure compensation mechanism 171 is disposed therein. Further, a connector 180 is provided in the pressure-resistant container 170. The respective motors 130 and the control unit (motor driver) 150 are connected by the cable (wire) 181 passing through the connector 180, and the supply of power and control is performed through the cable 181. The control unit 150 is disposed farther in a lower stage than the positions at which three sets of the valve 120 and the motor 130 are disposed. The control unit 150 is housed in a separate pressure-resistant container.

Figure 7:
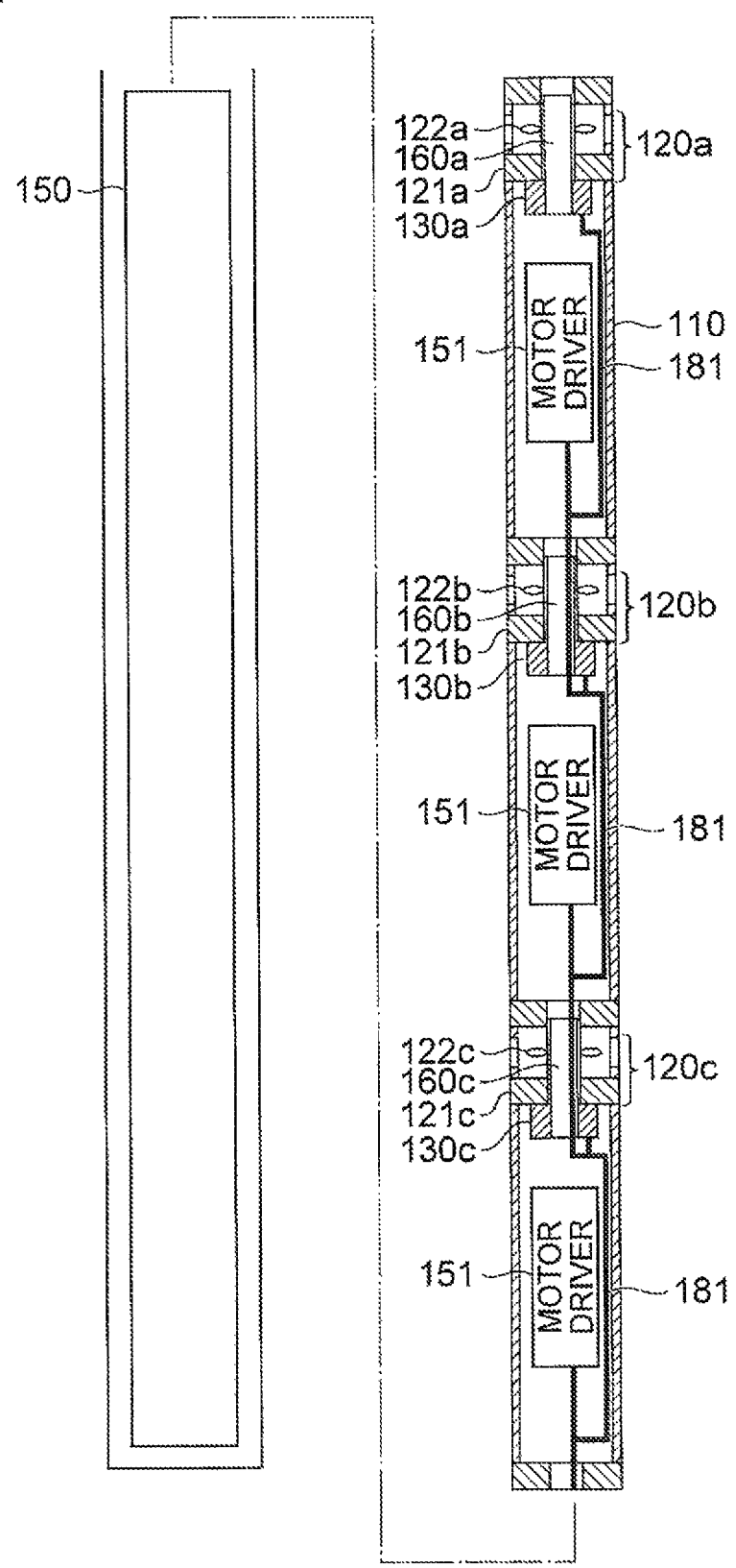
FIG. 7 is a diagram illustrating still another example of structures (arrangements) of the valve, the motor, and the like of the transmission apparatus.

FIG. 7 illustrates a structure in which the motors 130 (hollow motors) are connected in series and wired to the hollow portions of the motor 130 and the shaft 160, and wired to an outer container housing the control unit 150. In the present structure, similarly to FIG. 6, the motor 130 is provided for each valve 120. The cable 181 connecting the motors 130a, 130b, and 130c and the control unit 150 is disposed through the hollow portions of the shaft 160b and the motor 130b for operating the valve 120b of the middle stage and through the hollow portions of the shaft 160c and the motor 130c for operating the valve 120c of the lower stage, except for the valve 120a of the upper stage. Further, the motor driver 151 for operating the motor may be disposed in the vicinity of the motor 130 as in this configuration. The wiring according to the motor driver 151 is also disposed similarly.

It is possible to reliably configure the transmission apparatus 100 according to the present embodiment even with the configuration for providing the motors 130 for the respective valves 120 as illustrated in FIGS. 6 and 7. Further, since the motors 130 are provided for the respective valves 120, unlike the example illustrated in FIG. 5, it is possible to respectively use the same valves 120, motors 130, and shafts 160, thereby easily realizing the transmission apparatus 100.

Subsequently, the aperture ratio of the valve (the blocking portion and the modulator) 120 of the transmission apparatus 100 will be described. It is possible to regulate the aperture ratio in view of the following contents. It is possible to design a model of a modulator generating a mud pulse by installing a virtual valve in the flow path and changing the resistance coefficient of the valve.

FIG. 2 illustrates a stator (stator unit) 121 and a rotor (rotor unit) 122 which are components of the valve. The rotor 122 is configured with four blocking portions 1221 (four blades 1221) as described above. The rotor 122 rotates so as to block the holes 1211 of the stator 121 (flow path) and to increase the pressure therein. With one rotation (360 degrees) of the rotor 122 having four blocking portions 1221, four cycles of pressure wave changes can be viewed. The valve has a structure of having a gap of several millimeters between the stator 121 and the rotor 122 (in the depth direction of the paper in FIG. 2) such that a circulation flow path is not completely blocked. Further, with respect to data transmission, a pressure waveform is transmitted as symbols of 1/0 data by instantaneously stopping the rotation of the rotor 122 so as to change the phase of the pressure wave.

The resistance coefficient $K_{ROT}$ of the valve 120 to be converted along with the rotation of the rotor 122 is defined by the following equation.

$$K_{ROT} = (Q/\sqrt{H})\tau = K_0 \tau \qquad \text{[Equation 3]}$$

Here, τ is "an aperture ratio of the flow path as viewed from the upper direction (the axial direction of the tubular member 110)" of the valve 120. The total cross-sectional area (the cross-sectional area of the inner diameter of the tubular member 110) is At, the center part area of the stator 121 is As, Q is a flow rate [m³/s] in a steady state, H is a pressure difference (head loss) [m] (between the upper part and the lower part of the valve 120) in the steady state. Here, the center part of the stator 121 is a part in which there is also no hole 1211 in any position in a circumferential direction. Further, when there is no overlapping portion between the holes 1211 of the stator 121 and the blocking portions 1221 of the rotor 122, "the aperture ratio of the flow path as viewed from the upper direction" is 0%. When there is an overlapping portion between the holes 1211 of the stator 121 and the blocking portions 1221 of the rotor 122, "the aperture ratio of the flow path as viewed from the upper direction" at this time is expressed by the following equation.

$$\tau = \frac{At - As - \frac{1}{2}(At - As)}{At} \qquad \text{[Equation 4]}$$

$$= \frac{\frac{1}{2}(At - As)}{At} = \frac{1}{2}\frac{\frac{\pi d^2}{4} - \frac{\pi d_c^2}{4}}{\pi d^2/4} = \frac{1}{2}\frac{d^2 - d_c^2}{d^2} = 0.3839$$

Here, d is the diameter of the total cross-sectional area as illustrated in FIG. 2(c), and dc is the diameter of the center part of the stator 121.

If there is no overlap at time 0, when time t has elapsed, there is an overlapping portion of angle·t. The area Ac of the overlapping portion is expressed by the following equation.

$$Ac = \left(\frac{\pi d^2}{4} - \frac{\pi d_c^2}{4}\right)\frac{\omega t}{2\pi} \qquad \text{[Equation 5]}$$

Here, as illustrated in FIG. 2(c), cot of the rotor 122 is an angular velocity. "The aperture ratio of the flow path as viewed from the upper direction" at this time is expressed by the following equation. Further, the total overlapping area between the hole 1211 of the stator 121 and the blocking portion 1221 is Acz.

$$\tau = \frac{Acz}{At} = \frac{\left(\frac{\pi d^2}{4} - \frac{\pi d_c^2}{4}\right)\frac{\omega t}{2\pi}}{\pi d^2/4} = \left(1 - \frac{d_c^2}{d^2}\right)\frac{\omega t}{2\pi} \qquad \text{[Equation 6]}$$

In this model, the maximum aperture ratio is 0.3839, but the half thereof, that is, the pressure oscillation T' based on a return pressure center value is simulated as the following equation.

$$\tau' = \tau - 0.3839/2 \qquad \text{[Equation 7]}$$

Further, the resistance coefficient $K_{TOTAL}$ of the valve 120 is expressed by the following equation.

$$K_{TOTAL} = K_{GAP} + K_{ROT} = K_{GAP} + K_0 \tau' \qquad \text{[Equation 8]}$$

Here, $K_{GAP}$ is a resistance coefficient of a gap portion, and $K_0$ is a resistance coefficient inherent in a material. The aperture ratio varies at every moment, and thus it is possible to achieve the effect of the rotation of the rotor 122 as the form of the resistance coefficient. Further, the analysis as described above enables confirmation of the maximum and minimum pressures of the pressure wave and the relationship between the position and the pressure wave. Hitherto, the configuration of the transmission apparatus 100 has been described above.

Subsequently, the reception apparatus 200 according to the present embodiment will be described. The reception apparatus 200 is an apparatus that detects the measured waveform of the pressure wave 420 generated by the transmission apparatus 100 and extracts (decodes) information (received information) from the measured waveform. As illustrated in FIG. 1, the reception apparatus 200 is configured to include a pressure sensor 210, a processor 220, and a monitor 230.

The pressure sensor 210 is an apparatus that is attached to a portion of the ground or shipboard in the flow path (stand pipe) 350, and detects the magnitude of the pressure wave 420 generated in the drilling mud 410 by the transmission apparatus 100 in time series. In other words, the pressure sensor 210 has one function of waveform detection means for detecting the measured waveform of the pressure wave 420. The pressure sensor 210 continuously performs the detection of the pressure, and outputs the detected pressure as a voltage value or a current value to the processor 220. The pressure sensor 210 performs detection of pressure, for example, at intervals of several milliseconds or several tens of milliseconds. In addition, an existing pressure sensor can be used as the pressure sensor 210. The pressure sensor 210 and the processor 220 are connected by the sensor cable, and information which is output from the pressure sensor 210 is received by the processor 220.

The processor 220 inputs the voltage value or the current value indicating the pressure value from the pressure sensor 210, and extracts received information based thereon. The processor 220 is, for example, a computer including a CPU, a memory, and the like. The processor 220 outputs, for example, the extracted received information to the monitor 230. The monitor 230 performs the display output of the received information.

Figure 8:
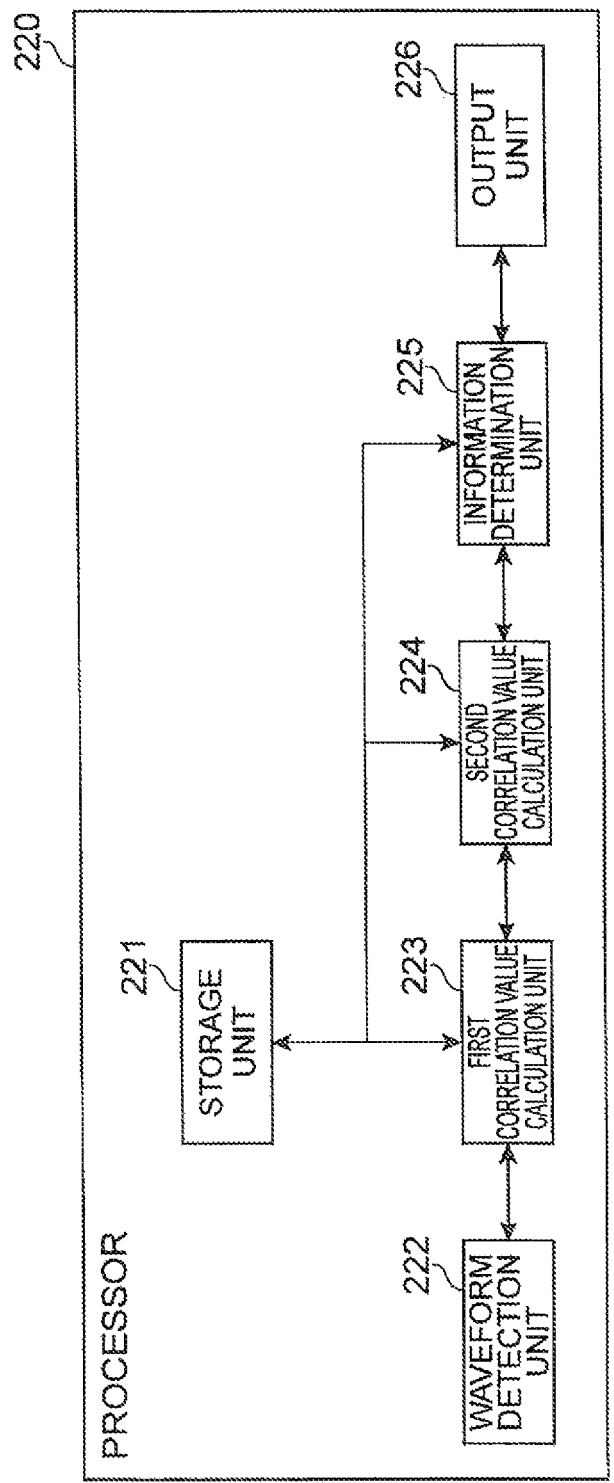
FIG. 8 is a diagram illustrating the functional components of a processor of the reception apparatus.
Figure 9:
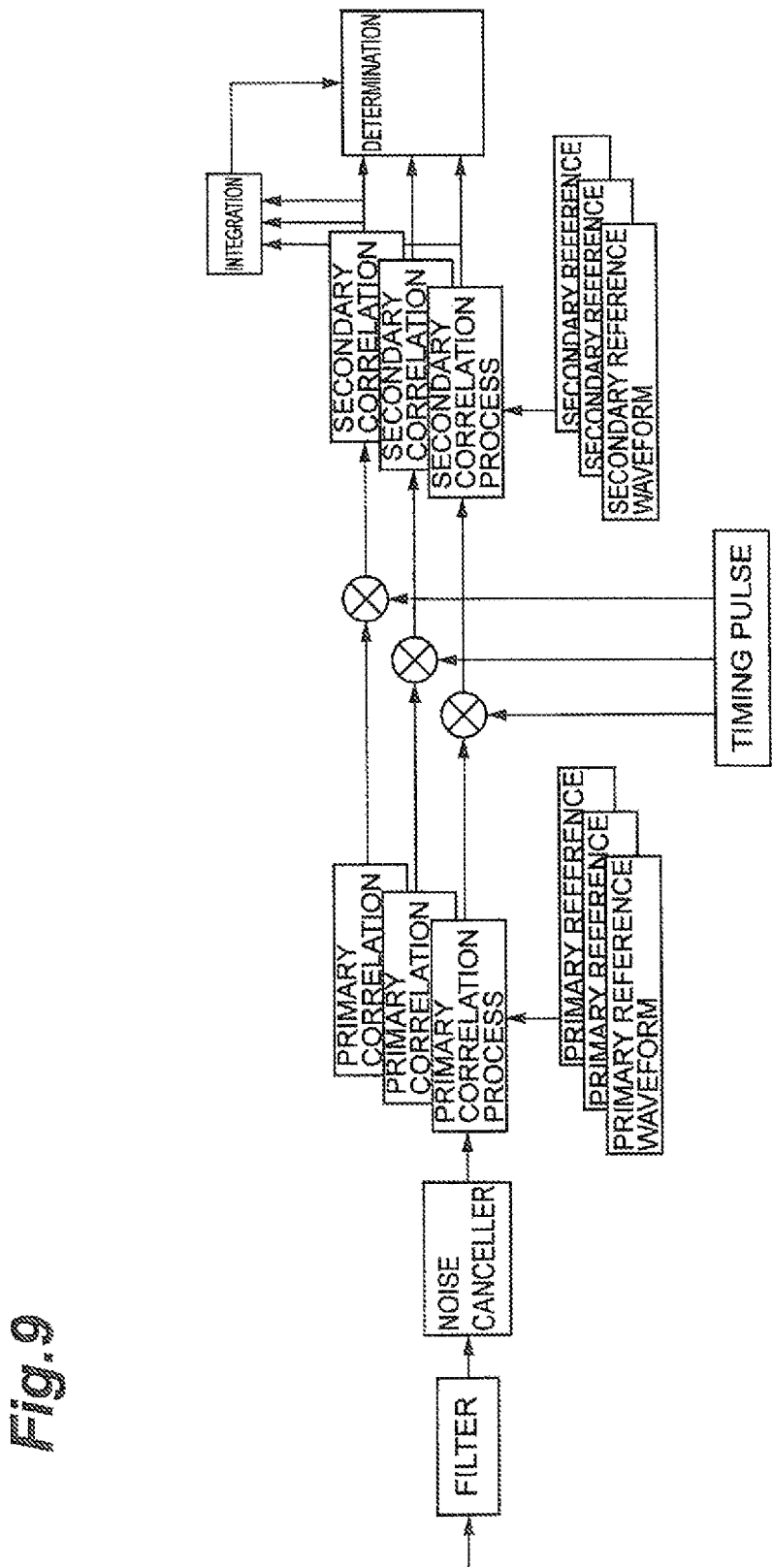
FIG. 9 is a diagram schematically illustrating a procedure from the input (pressure gauge data) of a pressure sensor to extraction of information, in the reception apparatus.

The function of extracting the received information of the processor 220 will be described. As illustrated in FIG. 8, the processor 220 is configured to include a storage unit 221, a waveform detection unit 222, a first correlation value calculation unit 223, a second correlation value calculation unit 224, an information determination unit 225, and an output unit 226, as functional components. Further, FIG. 9 schematically illustrates a procedure from input (pressure gauge data) from the pressure sensor 210 to extraction of information.

The storage unit 221 is storage means for storing information indicating a plurality of reference waveforms and information in which a set of reference correlation values indicating reference correlations of the number of the reference waveforms and information to be extracted are associated. The reference waveform and the reference correlation value are information to be referred to at the time of extracting (decoding) the information from the measured waveform of the pressure wave 420. The information stored in the storage unit 221 is referred to by the first correlation value calculation unit 223, the second correlation value calculation unit 224, and the information determination unit 225, but the detailed description of the information will be made in the description of the respective functional units.

The waveform detection unit 222 has one function of waveform detection means for accepting an input from the pressure sensor 210 and detecting a measured waveform of the time series of a pressure wave generated in the drilling mud 410. The waveform detection unit 222 A/D converts pressure gauge data (a voltage value or a current value indicating the detected pressure) which is an input from the pressure sensor 210 so as to obtain a digital value. The pressure wave f(t) detected by the pressure sensor 210 includes the pressure wave P(t) generated by the transmission apparatus 100 and noise components such as pipe vibration and pump pulsation, and thus the pressure wave f(t) is expressed as "f(t)=P(t)+Noise". Thus, the waveform detection unit 222 performs a filtering for unnecessary band cut and a noise canceling process for removing noise components on the A/D converted pressure wave (corresponds to a filter of FIG. 9 and a noise cancel). In addition, the processes are performed by general existing methods. The pressure wave (measured waveform) after noise cancellation is assumed to be f(t). The waveform detection unit 222 outputs f(t) to the first correlation value calculation unit 223.

The first correlation value calculation unit 223 is first correlation value calculation means for calculating a first correlation value indicating a correlation between the measured waveform f(t) detected by the waveform detection unit 222 and each of the plurality of reference waveforms indicated by information stored in the storage unit 221. The reference waveform is a waveform which is set in advance. Specifically, although the same reference waveform as the reference waveform used in the sliding correlation in the related art can be used, it is possible to use a waveform of any shape considering the characteristics of the present invention. Further, the number of reference waveforms that are used (stored by the storage unit 221) may be, for example, the same as the number of pieces of information (symbols) to be extracted, similarly to the sliding correlation in the related art, but not necessarily the same, and may be any one of a plurality of numbers. Further, the time length of the reference waveform is a length that is set in advance, and corresponds to the width of a pressure wave corresponding to an individual bit pattern (one symbol) transmitted from the transmission apparatus 100. Specifically, the width is 250 milli-seconds in an example of the present embodiment.

Since a combination of the frequency and the phase of the pressure wave on which information is carried is known, $R_1$ which is a reference signal constituting a reference waveform also can be expressed by, for example, the following equation, similarly to the pressure wave P.

$$R_1^k = \sum_{i=1}^{K} \sin(2\pi f_i t + \varphi_i) \quad \text{[Equation 9]}$$

The length of the reference signal is also the period T (that is, t=0 to T) of the waveform. Here, k is the reference waveform number (index). Further, K is the number of patterns of the waveform on which information is carried. K is given as follows by the number N of stages (the number of valves 120 in the transmission apparatus 100) and the resolution r of a phase.

$$K = r^N$$

For example, if it is assumed that N=3 and the resolution of $\phi$ is 4 ($\phi$=0, $\pi/2$, $\pi$, and $3\pi/2$), it is established that K=64. This improves the number of stages and the phase resolution, thereby increasing the patterns of waveforms and improving the communication speed of information.

The first correlation value calculation unit 223 takes a correlation between the (primary) reference waveform $R_1$ and f(t), and calculates a primary correlation function waveform expressed as follows (corresponds to a primary correlation process of FIG. 9).

$$C_1^k(t) = \int f(t) \cdot R_1^k(t-\tau) dt \quad \text{[Equation 10]}$$

Here, f(t) is a normalized waveform. Here, $\tau$ is a sliding time. Further, the measured waveform f(t) used herein has a width of the pressure wave corresponding to the individual bit pattern (one symbol). Specifically, the width is 250 milli-seconds in the example of the present embodiment. Thus, the correlation function C(t) of the number of reference waveforms is obtained.

Figure 10:
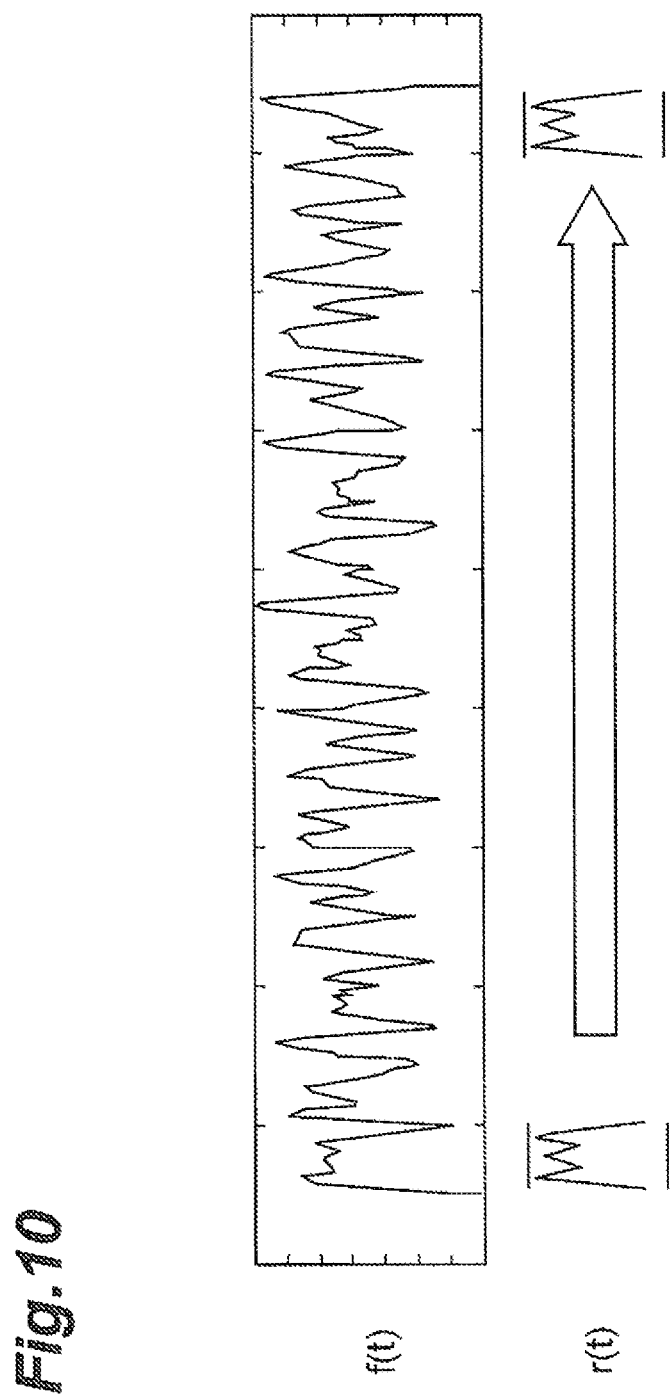
FIG. 10 is a diagram illustrating an example of a sliding correlation by a primary correlation waveform.

Further, the primary correlation function waveform is calculated by sequentially shifting the position (time) of the measured waveform f(t) to the position (time) corresponding to the subsequent bit pattern (one symbol). FIG. 10 illustrates an example of the sliding correlation by a primary correlation waveform. Here, the horizontal axis represents time, and the vertical axis represents pressure values.

Figure 11:
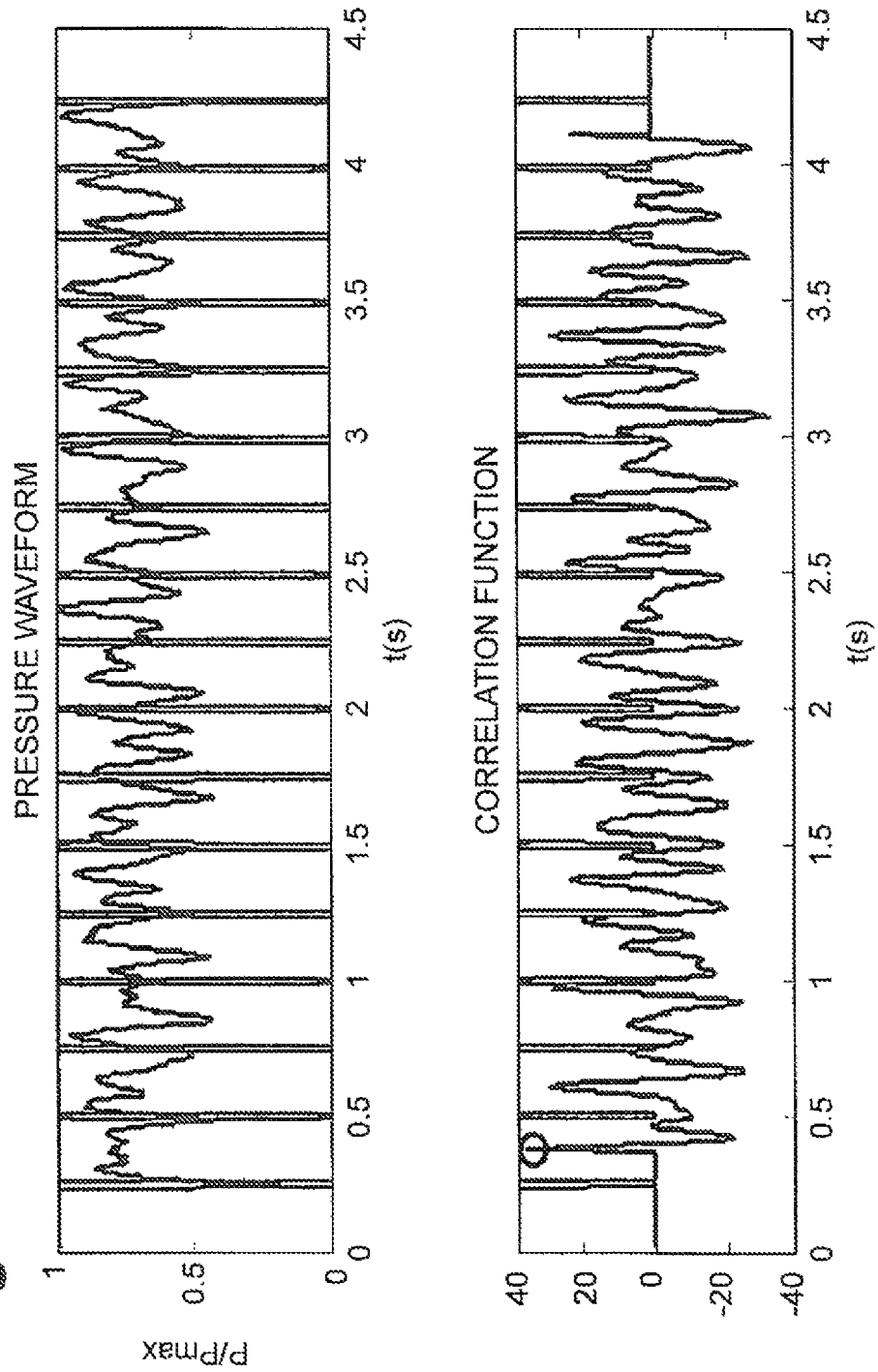
FIG. 11 is a graph illustrating a correlation function of a result of performing the sliding correlation on the pressure waveform by using a reference waveform.

Further, FIG. 11 illustrates a correlation function of a result of performing sliding correlation on various pressure waveforms by using the reference waveform r(t) illustrated in FIG. 10. Through the sliding correlation in the related art, it is possible to calculate and display a waveform in which a high correlation is calculated as a data symbol from the matching to the reference waveform.

Figure 12:
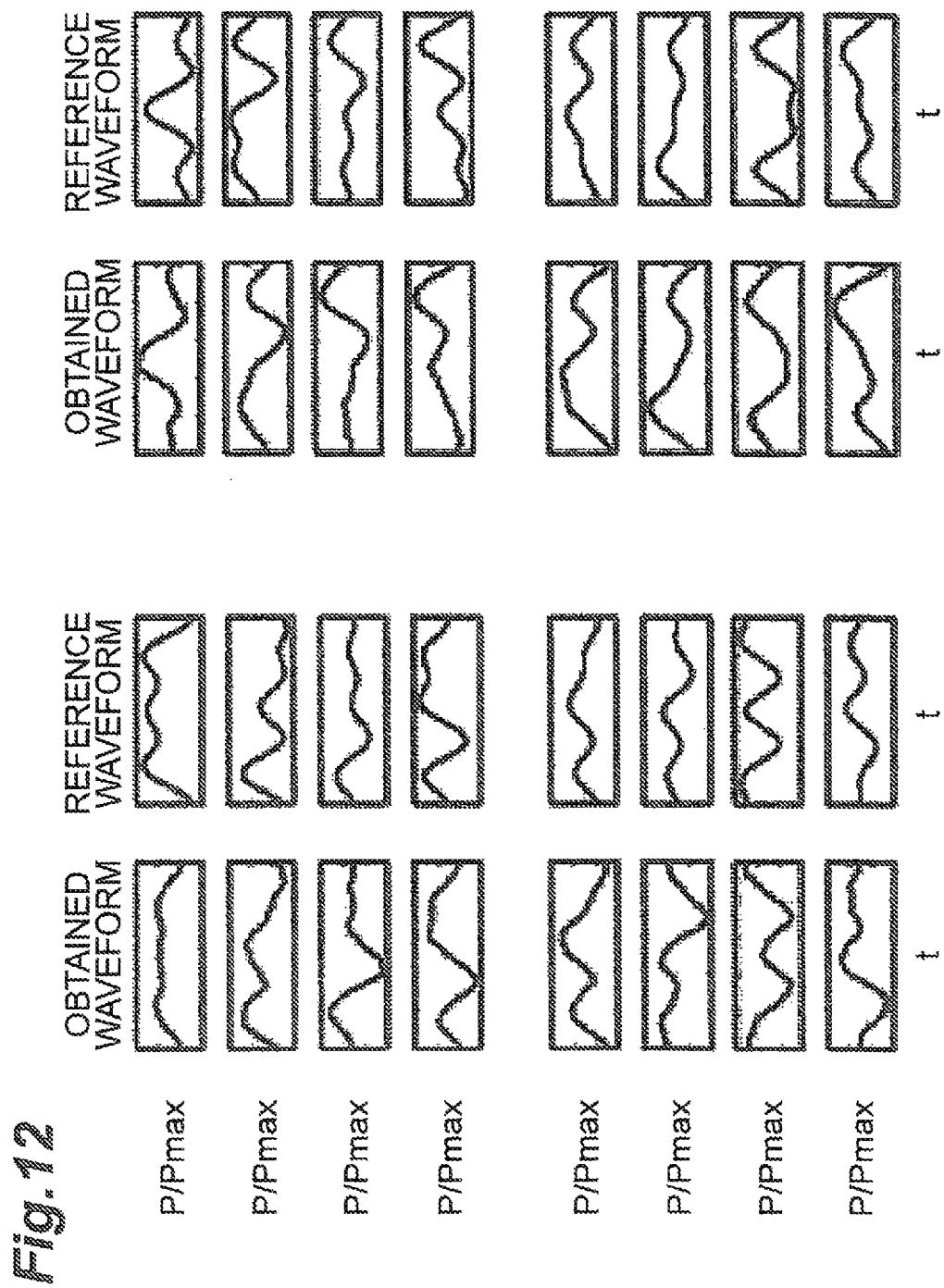
FIG. 12 is a diagram illustrating an example of matching between a waveform (measured waveform) that is actually obtained and the reference waveform.

FIG. 12 illustrates an example of matching between a waveform that is actually obtained (measured waveform) and a reference waveform. The horizontal axis is a time, and the vertical axis is a value obtained by dividing the measured pressure by the maximum pressure value to normalize. Data is read which is obtained by performing the primary correlation processed by the sliding correlation with the reference waveform.

For example, there are two following patterns as methods of generating the reference waveform.

(1) Generation by a Theoretical Equation

Since a pressure waveform pattern can be calculated theoretically, a waveform that has been derived in advance from the theoretical equation is used. At a shallow depth, a similar waveform can be obtained by a filtering and a noise cancellation, and thus the process is possible by the method.

(2) Generation Using a Pressure Wave

In a low SN environment such as deep water drilling, it is considered that the pressure wave after filtering and noise cancellation is different from that obtained from the theoretical equation. In that case, all existing patterns to be used are transmitted, and then the patterns are used as the reference signals. At this time, an impact of noise is cancelled to some extent by performing the filtering, the noise cancellation, and the signal integration using all patterns which are sent a plurality of times.

A separation by time (time stamp) for correlating data will be described below. Since the respective waveforms of the pressure wave arrive at a certain period T, the first correlation value calculation unit 223 samples the correlation function $C_1$ obtained by the primary correlation process at a period T, and extracts the center value of each waveform of the correlation function C (corresponds to a process using a timing pulse of FIG. 9). At t=mT, $C_1^k(t)$ (center value) is given as $C_1^k(m)$, using a discrete timing m. Here, a known start pattern having a relatively long time may be formed ahead of the waveform on which information is carried, and the start timing of the sampling may be extracted based on the peak through the correlation process of the pattern. Further, since it has been described that the sampling is performed at an instantaneous value mT, for simplicity, sampling is not actually extracted at a point, and sampling is performed with a certain time width, as a measure at the time of noise being mixed, and the sampled C(t) is obtained by a time-integration with the width.

In addition, technically, if there are k types of reference signals (reference waveforms), k types of sliding correlations (calculation of a primary correlation function waveform by the first correlation value calculation unit 223) are performed simultaneously. The timing pulses are applied sequentially at the same time while moving to the subsequent symbol, and thus the secondary correlation process is performed in sequence. This makes it possible to perform a process in real time.

Through the above process, the first correlation value calculation unit 223 obtains numeric values $C_1^k(m)$ of the number of reference waveforms for respective widths of the pressure waves corresponding to the individual bit patterns in the f(t) of the measured waveform, as the set of first correlation values. The first correlation value calculation unit 223 inputs the obtained numeric value $C_1^k(m)$ to the second correlation value calculation unit 224.

The second correlation value calculation unit 224 is second correlation value calculation means for calculating a second correlation value indicating a correlation between $C_1^k(m)$ which is a set of the first correlation values which are input from the first correlation value calculation unit 223 and the set of the reference correlation values indicated by information stored in the storage unit 221. In the above primary correlation process, a correlation function between the pressure wave and each reference waveform is obtained, and $C_1^k(m)$ is obtained. In the sliding correlation of the related art, generally, the sharp peak of $C_1^k(m)$ is obtained at a timing in which the pattern included in the pressure wave and the pattern of the reference waveform match, and thus the pattern detection is possible at this timing. However, as described above, in the present embodiment, since the carrier propagates in liquid, the carrier cannot be a carrier of a high frequency as in wireless communication, so that the sharp peak of each correlation function value is not obtained and appropriate pattern detection cannot be performed.

In the secondary correlation process by the second correlation value calculation unit 224, instead of detecting a peak, a waveform pattern including a certain information arriving at a certain timing is detected focusing on a correlation function pattern configured with a plurality of a correlation function values obtained by respective reference waveforms. With respect to the primary correlation function sequence obtained between a plurality of reference waveforms and the pressure waves, the correlation function sequence (set of reference correlation values) has been generated in advance as the secondary reference waveform, and matching is respectively performed. Here, the elements of the same number as the number of reference waveforms are included in one correlation function sequence (a set of reference correlation values). Further, the number of correlation function sequences is the number of associated pieces of information (received information). The numbers can be arbitrarily set.

Figure 13:
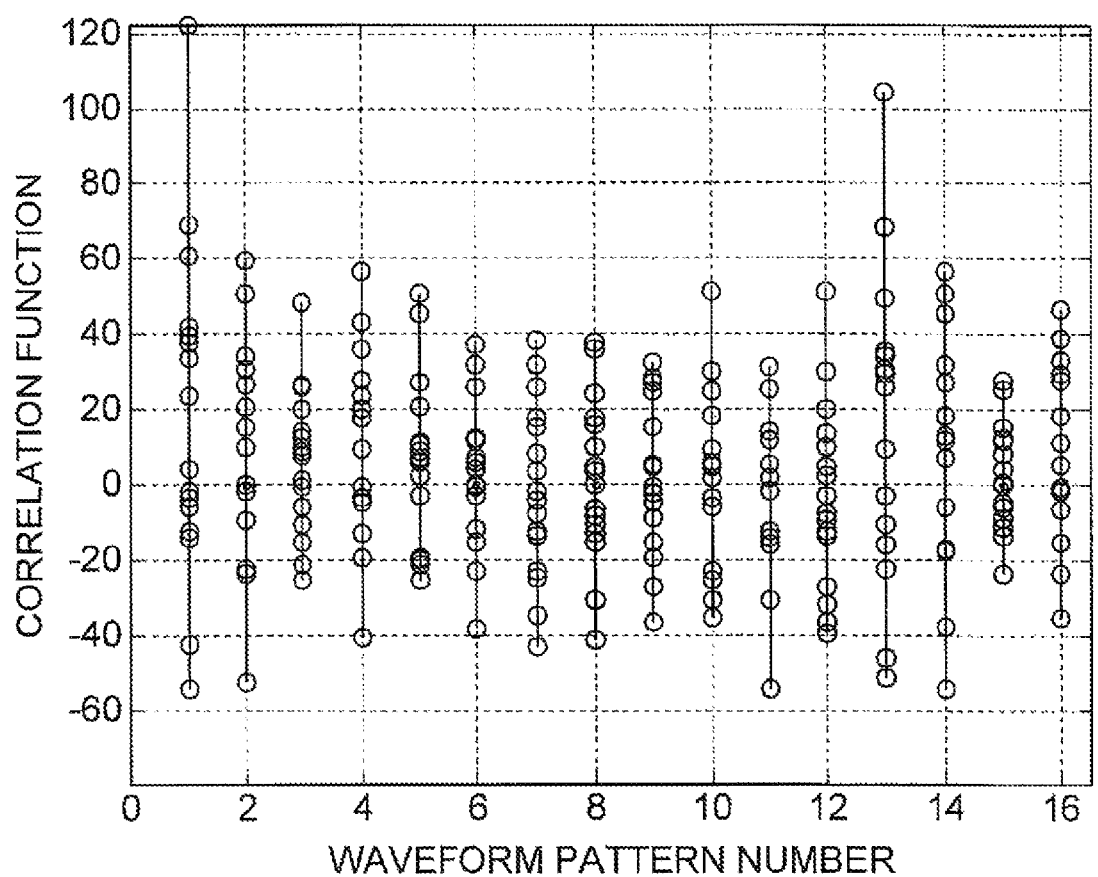
FIG. 13 is a graph of correlation function values between each reference waveform and a pressure wave, for each waveform pattern number.

FIG. 13 illustrates a graph of a correlation function values $C_1^k(m)$ between respective reference waveforms and pressure waves for each waveform pattern number. Here, the waveform pattern number is a number assigned to each period T of the pressure wave.

With respect to $C_1^k(m)$ obtained in the primary correlation process, the function value configured with the respective reference waveforms k of the sampling number (waveform pattern number) m in period T is focused. In other words, with respect to $C_1^k(m)$ two-dimensionally configured with the time and the number of reference waveform patterns, if a function sequence is created, with the waveform pattern instead of time as a horizontal axis, m and k are transposed, and thus $C_1^m(k)$ is obtained. The function is the sequence of the respective correlation function values (a set of first correlation values) obtained through the correlation with all k reference waveforms at time m that a certain waveform pattern arrives. In other words, if matching between "a known waveform pattern among k arriving at a certain time and the correlation function sequences configured with all k patterns although which one is unclear" including noise to some extent and "all k patterns and the correlation function sequences configured with all k patterns" is performed, there is a necessarily matching case, and it can be regarded as a waveform pattern at the arrival time m. If it is expressed by an equation, a secondary reference waveform (set of reference correlation values) for performing matching with $C_1^k(m)$ becomes $R_2^k(k)$, by a two-dimensional matrix of a known number k of waveforms.

The value of matching (correlation coefficient) between the secondary reference waveform and $C_1^m(k)$ obtained by transposing $C_1^k(m)$, in other words, the correlation coefficient $J_1^m(k)$ which is the result of the secondary correlation process is as follows.

$$J_1^m(k) = C_1^m(k) \cdot R_2^k(k)$$

The correlation coefficient value $J_1^m(k)$ is specifically calculated by the following equation.

[Equation 11]
$$J_l^m(k) = \frac{\sum_{i=1}^{n}(x_i - \bar{x})(y_i - \bar{y})}{\sqrt{\sum_{i=1}^{n}(x_i - \bar{x})^2}\sqrt{\sum_{i=1}^{n}(y_i - \bar{y})^2}}$$

$$x_k = C_1^m(k),\ y_k = R_2^k(k)$$

In addition, the superscript bars in the above equation indicate means.

In the process, at a certain time m, the matching between $C_1^m(k)$ and $R_2^k(k)$ is preformed K times. In other words, the second correlation value calculation unit 224 calculates the correlation coefficient value of the number of sets of the reference correlation values stored in the storage unit 221 (corresponds to the secondary correlation process of FIG. 9). The second correlation value calculation unit 224 outputs the calculated correlation coefficient value to the information determination unit 225.

The information determination unit 225 is information determination means for determining information to be extracted from the measured waveform (pressure wave) detected by the waveform detection unit 222, from the second correlation value calculated by the second correlation value calculation unit 224 and information stored by the storage unit 221. The storage unit 221 stores the sets of reference correlation values in association with the information to be extracted (individual pieces of information to be decoded). The information determination unit 225 determines the waveform number k indicating the highest value among a plurality of (as described above, if the number of sets of reference correlation values is K, K pieces) input correlation coefficients as the detection waveform pattern (set of reference correlation values) at time m. In addition, instead of using a pattern having the correlation coefficient indicating the highest value as the detection waveform pattern, the detection waveform pattern may be determined by performing maximum likelihood determination. The information determination unit 225 extracts the information associated with the set of reference correlation values corresponding to the waveform number as information regarding the time (period T) of the pressure wave, from the information stored in the storage unit 221 (corresponds to the determination of FIG. 9).

For example, when time m=1, at k=3, in k=1 to K, if the correlation coefficient has a maximum value, the third reference waveform arrives at time of m=1. In other words, information carried at k=3 (information associated with the set of reference correlation value indicated as k=3) is obtained. The information determination unit 225 outputs the determined information to the output unit 226.

The output unit 226 is output means for outputting information (received information) which is input from the information determination unit 225. The output is output to, for example, the monitor 230.

In the example described above, only one set of reference correlation values (known reference function sequence waveform) is associated with information to be extracted. However, it is possible to store a plurality of sets of reference correlation values in association with information to be extracted in the storage unit 221, and perform an integration process which will be described later, using the stored sets. Thus, it is possible to prevent an erroneous detection of primary and secondary correlation processes (matching), by separating a correctly matching (correct answer) a correlation coefficient and the other (incorrect answer) correlation coefficient values.

Figure 14:
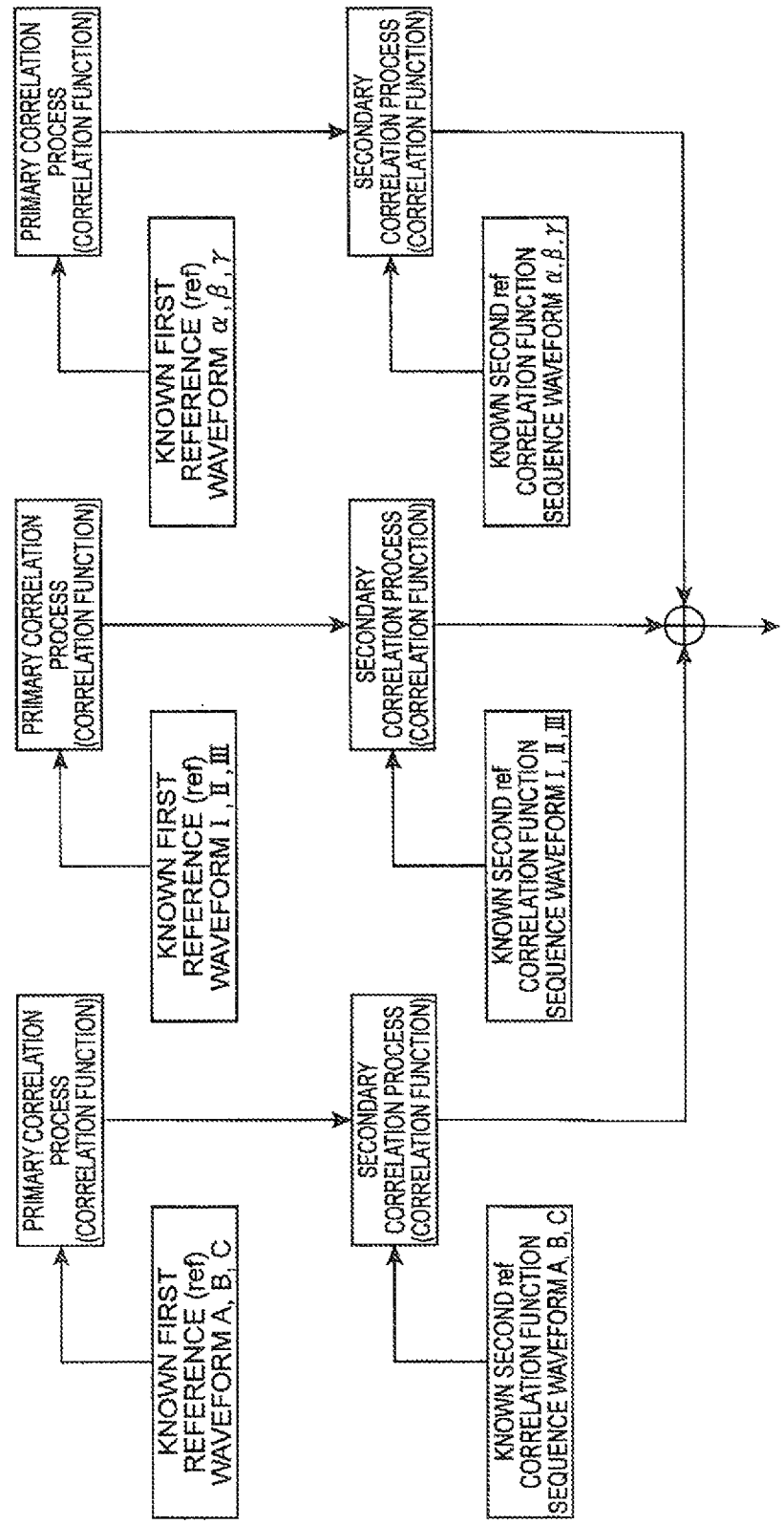
FIG. 14 is a diagram schematically illustrating a process in a case of performing an integration process.

FIG. 14 schematically illustrates a process in a case of performing an integration process. As illustrated in FIG. 14, a plurality of sets of reference waveforms are stored in the storage unit 221. For example, the set of waveforms A, B, and C, a set for waveforms I, II, and III, and a set for waveforms α, β, and γ are stored. Further, the sets of reference correlation values (function sequence waveform) associated with the respective sets of the reference waveforms are stored in the storage unit 221.

The first correlation value calculation unit 223 calculates a correlation function (first correlation value) with the measured waveform f(t), using the reference waveforms of the sets. Subsequently, the second correlation value calculation unit 224 calculates a correlation coefficient (second correlation value) of the respective calculated sets, using the function sequence waveforms of the sets. Thus, the correlation coefficients of the respective sets are calculated. Then, information associated with the maximum value of the integrated value is extracted as information corresponding to the time (period T) of the pressure wave, by integrating (summing up) the coefficients.

From the above processes, it is possible to detect a waveform by detecting k having a maximum value, from the correlation coefficients of $J^m(k)$ at time m. When the same waveforms are matched, $J^m(k)=1$, but in another case, $J^m(k)$ has various values from −1 to 1. It is assumed that matching at a time of k=10, a value of J=1 is taken, and at a time of k=1 and k=20, values of J=−0.3 and J=0.6 are taken.

When noise is mixed, the value of the correlation coefficient J fluctuates, with respect to k=10 which is a correct value, when a J value is reversed in cases of k=1, 20, an erroneous detection is performed. In this case, there is a high possibility of erroneously detecting k=20 having a high J value. In other words, "separating the matching correlation coefficients and the other correlation coefficient values" is important, and in order to prevent an erroneous detection, the integration process of correlation coefficients is performed.

Here, a primary reference signal $R_1$ is represented again.

$$R_1^k = \sum_{i=1}^{K} \sin(2\pi f_i t + \varphi_i) \qquad \text{[Equation 12]}$$

Although the sine function is used as a primary reference waveform in the above example, a differential wave $R'_1$ at time of the aforementioned $R_1$ is used here.

$$R'^k_1(t) = \frac{d R_1^k(t)}{dt} \qquad \text{[Equation 13]}$$

If the same process is performed using the equation, a correlation coefficient $J_d^m(k)$ is obtained using a differential reference waveform.

The above example of the matching at k=10 and the mismatching at k=1, 20 is considered. Even in a case using the differential wave, at a time of the matching at k=10, $J_d^m(10) \cong 1$, at times of k=1, 20, the values $J_d^m(1)=−0.2$ and $J_d^m(10)=0.1$ which are values independent of the earlier case are obtained.

Therefore, it is established that $J^m(1)+J_d^m(1)=0.3+(−0.2)=0.1$, $J^m(10)+J_d^m(10) \cong 1+1=2$, and $J^m(1)+J_d^m(1) \cong 0.6+0.1=0.7$.

It is confirmed that the correlation coefficients at the time of k=10 are separated from the correlation coefficients in other cases.

If describing by generalization, assuming the case number of the reference waveforms employing R(t), R'(t) . . . , the same waveform, and the differential waveform as L (l=1, 2, 3 . . . ), the following is established.

$$J_{int}^m(k) = \sum_{l=1}^{L} J_l^m(k)$$ [Equation 14]

Here, $J_{int}^m(k)$ is a correlation coefficient after integration of L number of times. In addition, waveforms such as the same waveform and the differential waveform are used, but in addition thereto, various waveforms such as a time reversed waveform (phase conjugate wave) and a second differential wave can be used. Since this is a scheme in which the secondary correlation process in the present embodiment does not use the peak of a correlation function, various waveforms can be selected.

Further, in the "integration process (process in parallel)", an integration effect of processing the following cases in parallel is shown. The following cases are the cases of the white noise (−6 dB) being mixed.

Figure 15:
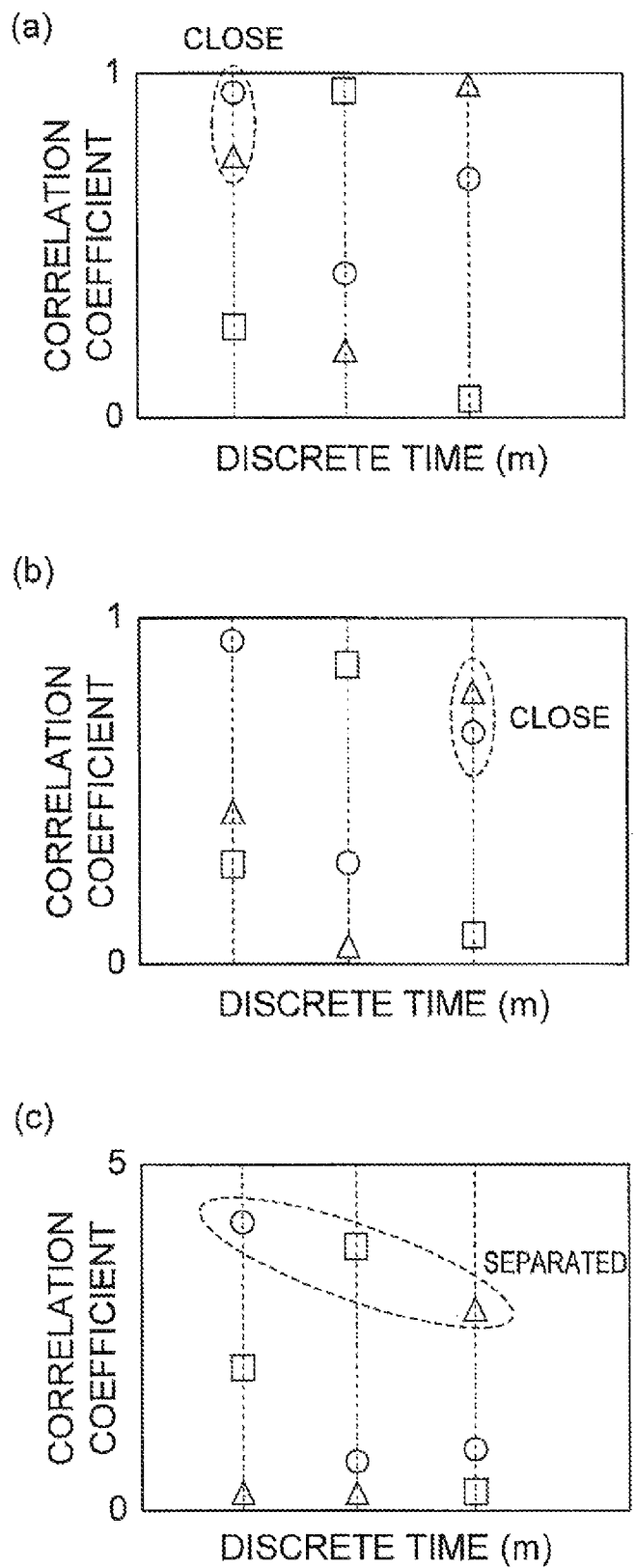
FIG. 15 is a diagram illustrating an effect caused by mixing a noise for performing the integration of a secondary correlation.

(1) applying the primary reference waveform of the pressure waveform, to the pressure waveform (2) applying the primary reference waveform of the differential pressure waveform, to the differential pressure waveform (3) applying the primary reference waveform of the pressure waveform, to the differential pressure waveform (4) applying the primary reference waveform of the differential pressure waveform, to the pressure waveform (5) applying the primary reference waveform of the time reversed pressure waveform, to the pressure waveform FIG. 15 illustrates an effect of mixing noise for performing an integration of a secondary correlation. FIG. 15(a) and FIG. 15(b) are graphs illustrating individual correlation coefficient values, FIG. 15(c) is a graph illustrating the integrated correlation coefficient value. In addition, FIG. 15 is an image diagram based on the actual measurement. In the graph, the horizontal axis represents discrete time (m), and the vertical axis represents a value of a correlation coefficient.

As illustrated in FIG. 15(a) and FIG. 15(b), in the individual correlation coefficient values, depending on the time, the correlation coefficient (correct answer) associated with information to be extracted and the correlation coefficient (incorrect answer) which is not associated with information to be extracted become close values. However, in the correlation coefficient values integrated as illustrated in FIG. 15(c), the correlation coefficient value of the correct answer is separated from the other correlation coefficient values. In this manner, even in a case of noise being mixed, it is possible to prevent an erroneous detection.

Here, the processes by the first correlation value calculation unit 223, the second correlation value calculation unit 224, and the information determination unit 225 will be described using a simple example. Sending the waveforms A, B, C, and D in which information is carried in the order of A, D, C, and B is assumed. In other words, it is assumed to transmit and receive pressure waveforms of f(t)=[A, D, C, B]. It is assumed to respectively fill information of "0000", "0001", "0010", and "0011" in A, B, C, and D (respective pieces of information are associated). In this case, f(t) is assumed to send information of "0000001100100001". Further, noise is not considered in this description.

When f(m) is described in discrete time m, it is established that f(1)=A, f(2)=B, f(3)=C, and f(4)=D. In the primary correlation process, four types of reference waveforms A, B, C, and D of $R_1^k(t)$ are prepared. In other words, the primary reference waveforms are $R_1^1(t)$=A, $R_1^2(t)$=B, $R_1^3(t)$=C, and $R_1^4(t)$=D. Here, if a primary correlation is applied to f(t)=[A, D, C, B], the correlation process between respective reference waveforms A, B, C, and D and the pressure waveforms f(t) are performed, and the correlation functions therebetween (first correlation values) are obtained, for example, the values shown in FIG. 16.

Sharp peaks appear in the waveforms corresponding to each other by right, but there are only similar waveforms, such that there is a case where a peak does not appear as illustrated in FIG. 16. In a case of detecting a peak, at the arrival waveform time m=1 of A, instead of A of value 10, C of value 12 is detected. Accordingly, in such a case, it is not possible to use a scheme of detecting a peak.

Thus, as illustrated in FIG. 17(a), the respective correlation functions are represented in the vertical axis. The functions have values related to a correlation between the known pressure waveform and the known reference waveform. Accordingly, as illustrated in FIG. 17(b), the secondary reference waveforms (set of reference correlation values) configured with the known waveforms are prepared.

Figure 19:
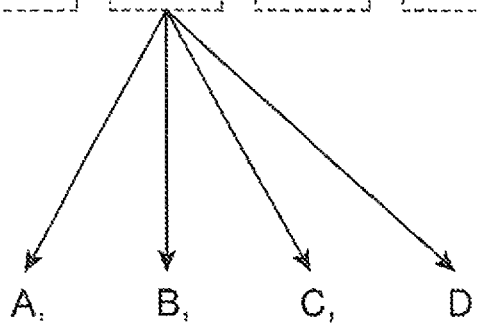
FIG. 19 is a diagram illustrating correlation coefficients (second correlation values) between a correlation function and a reference waveform of a simple process example in the reception apparatus.

As illustrated in FIG. 18, if the matching of $C_1^1(k)$ with $R_2^1(k)$, $R_2^2(k)$, $R_2^3(k)$, and $R_2^4(k)$ is performed (correlation operation is performed), $J^1(1)$, $J^1(2)$, $J^1(3)$, and $J^1(4)$ are obtained. Next, as illustrated in FIG. 19, if the matching of $C_1^2(k)$ with $R_2^1(k)$, $R_2^2(k)$, $R_2^3(k)$, and $R_2^4(k)$ is performed (correlation operation is performed), $J^2(1)$, $J^2(2)$, $J^2(3)$, and $J^2(4)$ are obtained. In other words, the correlation coefficients (second correlation values) with all four patterns are obtained.

If for example, a first example is considered, the correlation coefficient $J^m(k)$ is $J^1(1)$=1, $J^1(2)$=−0.2, $J^1(3)$=0.8, and $J^1(4)$=0.4, $J^1(1)$ having the correlation coefficient with $R_2^1(k)$ having matching numeric value has the maximum value 1. Since $R_2^1(k)$ is a function value sequence (a set of reference correlation values) obtained by using correlations between A and A to D, matching this can be determined as A arriving at a timing of $C_1^1(k)$. Similarly, since $R_2^4(k)$ is a maximum value in $C_1^2(k)$, D constituting it can be detected. Since $R_2^3(k)$ is a maximum value in $C_1^3(k)$, C constituting it can be detected. Since $R_2^2(k)$ is a maximum value in $C_1^4(k)$, B constituting it can be detected.

In addition, when noise is mixed, the function sequence after the primary correlation process of C(t) represents different values for the reference waveforms, which is the cause of the erroneous detection. Further, the bands other than the band of the pressure wave are cut by a filter. The noise components such as pump noise are cut by the noise cancellation.

Subsequently, an integration process will be described. The primary correlation is applied to f(t)=[A, D, C, B]. Here, the reference waveform is not the waveform of the same type with respect to A, B, C, and D, and waveforms of I, II, III, IV are prepared. As illustrated in FIG. 20, the correlation process of the respective reference waveforms A, B, C, and D and the pressure waveform f(t) is performed, and the respective correlation functions C(t) are obtained. Here, since the correlation results of the same waveforms are not presented, the results are not high values even in the corresponding positions (A=A).

Similarly to the above description, as illustrated in FIG. 21(a), the respective correlation functions are represented in the vertical axis. The functions have values relating to the correlation between the known pressure waveform and the known reference waveform. Accordingly, as illustrated in FIG. 22(b), the secondary reference waveforms which are configured with the known waveform are prepared.

If a matching between $C_1^1(k)$ and $R_2^1(k)$, $R_2^2(k)$, $R_2^3(k)$, and $R_2^4(k)$ is performed, (correlation operation is performed), it is established that $J_2^1(1)=1$, $J_2^1(2)=0.3$, $J_2^1(3)=-0.4$, and $J_2^1(4)=0.7$. $J_2^1(1)$ at the time of $R_2^1(k)$ having matching numeric values has a maximum value 1. Similarly, since $R_2^4(k)$ is a maximum value in $C_1^2(k)$, D constituting it can be detected. Since $R_2^3(k)$ is a maximum value in $C_1^3(k)$, C constituting it can be detected. Since $R_2^2(k)$ is a maximum value in $C_1^4(k)$, B constituting it can be detected.

Here, in the first example, the aforementioned correlation coefficients are obtained. In this example, approximate values are shown at k=1 and k=3, and in a case of noise being mixed, there is a concern of erroneous detection. Thus, the correlation coefficients obtained in the first example (an example of FIG. 16 to FIG. 19) and the next example (an example of FIG. 20 and FIG. 21) are added. In other words, if $J'''(k)$ in the first example is set to $J_1'''(k)$ and $J'''(k)$ in the next example is set to $J_2'''(k)$, the correlation coefficients are as follows. In other words, it is established that $$J_1^1(1)=1, J_2^1(1)=1,$$

$$J_1^1(2)=-0.2, J_2^1(2)=0.3,$$

$$J_1^1(3)=0.8, J_2^1(3)=-0.4, \text{ and}$$

$$J_1^1(4)=0.4, J_2^1(4)=0.7.$$

If the correlation coefficients are added in the case of the same k, it is established that $$J_1^1(1)+J_2^1(1)=1+1=2,$$

$$J_1^1(2)+J_2^1(2)=-0.2+0.3=0.1,$$

$$J_1^1(3)+J_2^1(3)=0.8+(-0.4)=0.4, \text{ and}$$

$$J_1^1(4)+J_2^1(4)=0.4+0.7=1.1.$$

The correlation coefficients between in a case of matching and in a case of mismatching are separated from each other, and thus the erroneous detection at the time of noise being mixed is reduced. Correlation coefficients obtained from the waveforms A, B, C, and D and I, II, III, IV, but A, B, C, and D and I, II, III, IV are different waveforms, such that the detection is possible. In the present embodiment, it is a detection scheme without using a peak, and this allows a set of various waveforms to be used. The configuration of the reception apparatus 200 has been described above.

Figure 22:
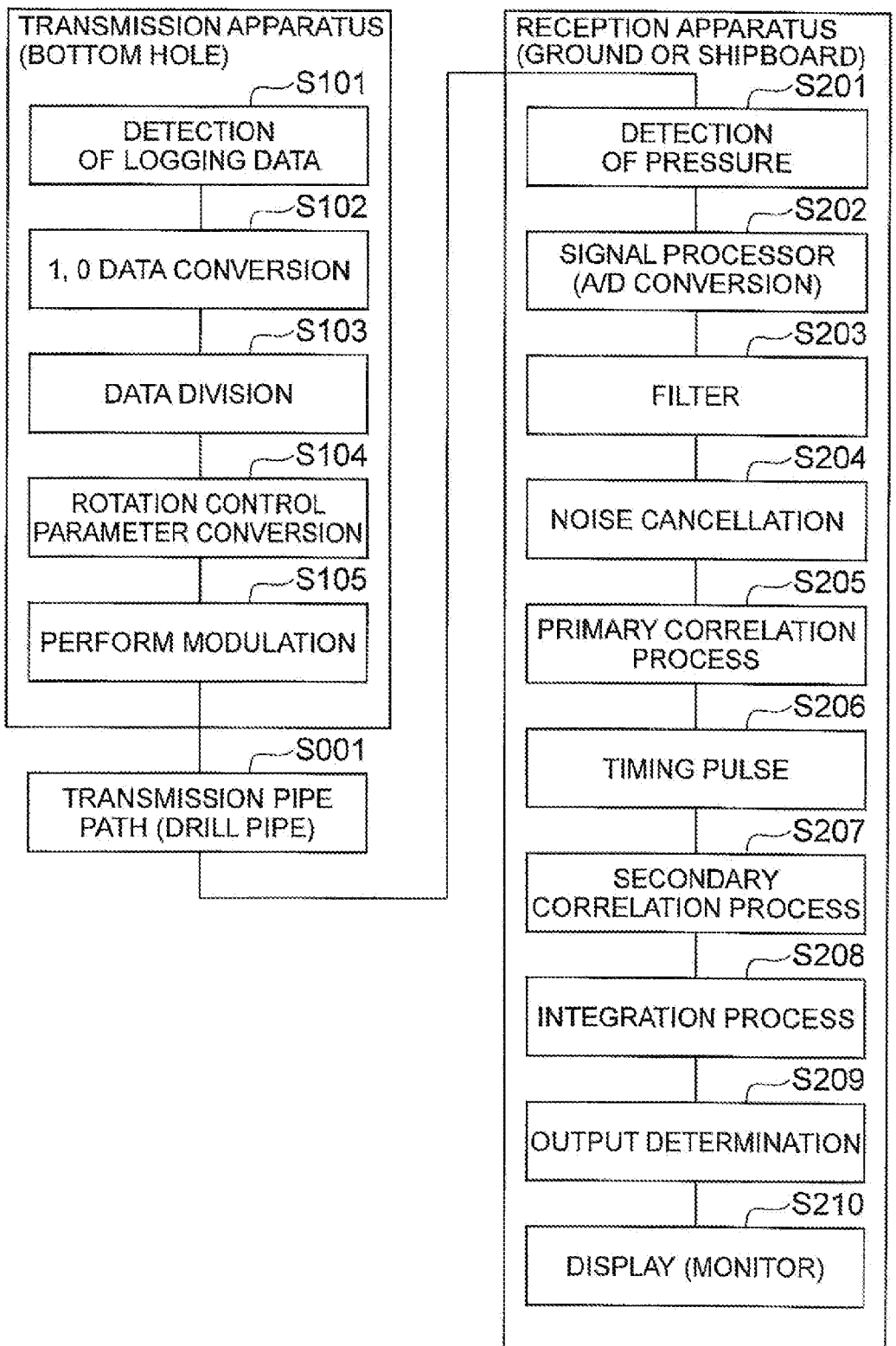
FIG. 22 is a flow chart illustrating operations of and processes performed in the transmission apparatus and the reception apparatus according to an embodiment of the present invention.

Subsequently, the operations of the transmission apparatus 100 and the reception apparatus 200 according to an embodiment and processes performed in the apparatuses will be described using the flowchart illustrated in FIG. 22. In the transmission apparatus 100, first, logging data which represents a predetermined physical quantity is detected by the sensor 140 (S101). The detected logging data is input from the sensor 140 to the control unit 150, as information to be transmitted from the transmission apparatus 100. Subsequently, by the control unit 150, the logging data is converted into bit string data (1, 0 data) (S102). Subsequently, by the control unit 150, the bit string is divided into a bit pattern of the number of input bits (the number of divided bits) (S103). Subsequently, the information illustrated in FIG. 3 is referred to by the control unit 150, the state of the valve 120 (the opening and closing ratio) is specified by the bit pattern to be transmitted, and converted into the rotation control parameter of the rotor 122 of the valve 120 according to the state. Subsequently, the motor 130 is controlled by the control unit 150 according to the rotation control parameter so as to rotate or stop the rotor 122 of each valve 120 (S105).

Through the above processes and operation, individual pressure waves from the respective valves 120 are generated in the flow of the drilling mud 410 according to the transmitted information, and the pressure waves are summed up so as to become a pressure wave 420 from the transmission apparatus 100. The pressure wave 420 propagates from the bottom of the hole toward the ground or shipboard direction along the flow path 350 (drill pipe and stand pipe) (S001).

The pressure wave 420 is detected in time series by the pressure sensor 210 of the reception apparatus 200 (S201). The voltage value or the current value indicating the pressure of the detected pressure wave 420 is transmitted from the pressure sensor 210 to the processor 220. In the processor 220, the input from the pressure sensor 210 is accepted by the waveform detection unit 222. Subsequently, the voltage value or the current value indicating the pressure is A/D converted by the waveform detection unit 222 (S202). Subsequently, the A/D converted value is subjected to filtering by the waveform detection unit 222 for a cut of unnecessary band (S203), and the removal of the noise component is performed (S204). The measured waveform obtained in this manner is input from the waveform detection unit 222 to the first correlation value calculation unit 223.

Subsequently, by the first correlation value calculation unit 223, a primary correlation process is performed on the measured waveform by using the reference waveform stored by the storage unit 221 (S205). Further, a correlation function $C_1$ obtained through the primary correlation process by the first correlation value calculation unit 223 is sampled at a period T, and the correlation function value (first correlation value) of each period T is obtained (S206). The correlation function value is input from the first correlation value calculation unit 223 to the second correlation value calculation unit 224.

Subsequently, by the second correlation value calculation unit 224, a secondary correlation process is performed on the correlation function value by using a secondary reference waveform (a set of reference correlation values) which is stored in the storage unit 221 (S207). Subsequently, an integration process of respective correlation coefficients which are obtained through the secondary correlation process is performed by the second correlation value calculation unit 224 (S208). In addition, the process is performed in a case where a plurality of secondary reference waveforms (set of reference correlation values) are used. However, the process may not be necessarily performed in the case where small noise is mixed or the like. The correlation coefficient obtained in the above manner is output from the second correlation value calculation unit 224 to the information determination unit 225.

Subsequently, the correspondence relationship between the secondary reference waveform and the information to be extracted (individual information to be decoded) stored in the storage unit 221 is referred to by the information determination unit 225, and information is extracted from the magnitude of the correlation coefficient corresponding to each secondary reference waveform (S209). The extracted information is output from the information determination unit 225 to the output unit 226. Subsequently, the information is output from the output unit 226 to the monitor 230, and is display output by the monitor 230.

As described above, in the transmission apparatus 100 according to the present embodiment, a plurality of valves 120 rotate or stop at different frequencies, and thus it is possible to generate pressure waves at respective frequencies. Therefore, according to the transmission apparatus 100 according to the present embodiment, a large amount of information can be included in the pressure wave which is used as a carrier of data, and in the data transmission by liquid such as a mud pulse, it is possible to transmit a larger amount of information.

The number K of bit patterns generated in the transmission apparatus 100 is given as $K=r^N$ by the rotation phase resolution r (the number of patterns of an opening degree) and the number N of stages of the modulator. For example, when the opening degree resolution is 50% and the number of stages is three, there are four steps of −50, 0, 50, and 100 at each stage, and thus the waveform of $4^3=64$ patterns can be generated.

Therefore, the information filling amount I (bit) per one waveform satisfies the following equation.

$$I=\log_2 K,$$

and is 6 bits in this case (in actual use, if the resolution number does not fit to the power of 2, the remaining patterns may be given in advance as a different resolution opening degree so as to correspond to the power of 2).

Therefore, the transmission speed V (bps) is given as V=I/T by an information amount I (bit) carried per one waveform and rotation time T (sec). In the example described above, in a case of T=0.25 sec, it is established that V=24 bps.

Since the transmission apparatus 100 according to the present embodiment operates at four bits per one symbol (data length 250 milli-seconds), the transmission speed is 16 bps. Further, if the demodulation scheme described above is used, it is possible to increase the combination of the phase patterns (the opening and closing ratio of the modulator) of the respective stages. Thus, transmission of 64 bps is possible logically. Further, it is possible to further increase the transmission speed by reducing the data length and increasing the rotation frequency, and thus it is estimated that transmission of 160 bps is also possible. If data of 10 bits is assumed to be included in one symbol, data transmission of total of 160 bps and 16 symbols during one second is possible.

Further, in the transmission apparatus 100, since the pulse motor is used as the motor 130, the opening degree of the blocking portion 122a of the rotor 122 can be correctly confirmed, and this makes the system simple in concept, and the instruction and the control of fully opening and fully closing the valve 120 easy. This prevents damage to the valve 120 (modulator) in each stage (for example, even if one stage is broken, data transmission is possible), which was difficult to do in the modulator using an electric motor of a single-stage type in the related art.

Further, using the demodulation processing as in the embodiment and detecting the information waveform itself by using correlation matching enables high-speed communication with a synthetic pressure wave that is generated by a multi-stage modulator, rather than the narrowband communication in the related art.

In the transmission apparatus 100 according to the present embodiment, since the carrier propagates in liquid, the carrier cannot be a carrier of a high frequency as in wireless communication. Therefore, it is difficult to appropriately extract information by the simple sliding correlation which extracts information only from the correlation value between the measured waveform and the reference waveform. In the reception apparatus 200 according to the present embodiment, the second correlation value with the set of values indicating the reference correlation is calculated based on the first correlation value with the reference waveform of the measured waveform, and the information to be extracted from the measured waveform (received information) is determined based on the second correlation value. Therefore, as compared to a case of using only the correlation value (first correlation value) between the measured waveform and the reference waveform, it is possible to further extract the information from the measured waveform appropriately.

Further, in the reception apparatus 200 according to the present embodiment, since the peak is not detected, the other reference waveforms of set 2, set 3 . . . which are not included in the reception wave can be used as the reference waveform. Anti-white noise performance is improved by integrating the matching results.

Further, as described above, in the present embodiment, two correlations including the correlation for calculating the first correlation value and the correlation for calculating the second correlation value are used. However, a method of using three or four correlations by the same method (in other words, a method of using a plurality of correlations for calculating the second correlation value) may be used. In this case, the storage unit 221 hierarchically stores the set of reference correlation values associated with the information to be extracted. Then, the second correlation value calculation unit 224 may calculate a correlation value indicating the correlation between the set of the first correlation values calculated by the first correlation value calculation unit 223 and the set of the reference correlation values of the bottom layer indicated by the information stored in the storage unit 221, calculate a correlation value the number of times according to the number of layers, using the calculated correlation value and the set of the reference correlation values of the subsequent layers, so as to calculate the second correlation value. According to the configuration, it is possible to perform reception more strong against noise.

Figure 23:
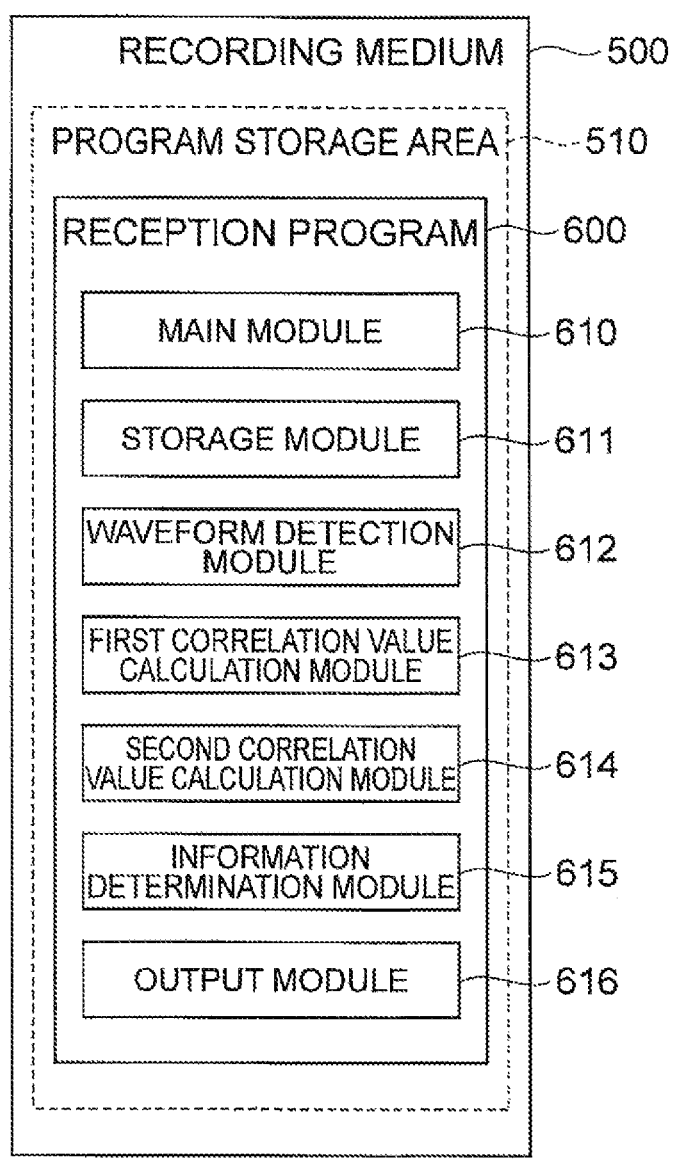
FIG. 23 is a diagram illustrating a configuration of a reception program according to an embodiment of the present invention and a recording medium.

Subsequently, a vibration communication program for causing the computer to execute the aforementioned series of processes of the reception apparatus 200 will be described. As illustrated in FIG. 23, the reception program 600 is loaded in the computer and accessed, or stored in the program storage area 510 formed in the recording medium 500 included in the computer.

The reception program 600 is configured to include a main module 610 performing overall control of the reception process, a storage unit module 611, a waveform detection module 612, a first correlation value calculation module 613, a second correlation value calculation module 614, an information determination module 615, and an output module 616. The functions are realized by using the storage unit module 611, the waveform detection module 612, the first correlation value calculation module 613, the second correlation value calculation module 614, the information determination module 615, and the output module 616 are the same as the respective functions of the storage unit 221, the waveform detection unit 222, the first correlation value calculation unit 223, the second correlation value calculation unit 224, the information determination unit 225, and the output unit 226 of the processor 220 of the reception apparatus 200 which are described above.

In addition, it may be configured such that the entirety or a part of the reception program 600 that is transmitted through a transmission medium such as a communication line, is received and recorded by another apparatus (including installation). Further, the respective modules of the reception program 600 may not be installed in a single computer, but may be installed in any of a plurality of computers. In this case, a series of reception processes of the reception programs 600 is performed by a computer system of the plurality of computers.

INDUSTRIAL APPLICABILITY

The reception apparatus, the transmission apparatus, and the transmission/reception system according to the present invention can be used in, for example, resource drilling for petroleum or the like and scientific drilling Further, the present invention can be applied to any field as long as in the field, liquid is filled into a hole and the liquid can be used as a transmission medium.

REFERENCE SIGNS LIST

1 . . . TRANSMISSION/RECEPTION SYSTEM, 100 . . . TRANSMISSION APPARATUS, 110 . . . TUBULAR MEMBER, 120 . . . VALVE, 121 . . . STATOR, 1211 . . . HOLE, 122 . . . ROTOR, 1221 . . . BLOCKING PORTION, 130 . . . MOTOR, 140 . . . SENSOR, 150 . . . CONTROL UNIT, 151 . . . MOTOR DRIVER, 160 . . . SHAFT, 170 . . . PRESSURE-RESISTANT CONTAINER, 171 . . . PRESSURE COMPENSATION MECHANISM, 180 . . . CONNECTOR, 181 . . . CABLE, 200 . . . RECEPTION APPARATUS, 210 . . . PRESSURE SENSOR, 220 . . . PROCESSOR, 221 . . . STORAGE UNIT, 222 . . . WAVEFORM DETECTION UNIT, 223 . . . CORRELATION VALUE CALCULATION UNIT, 224 . . . CORRELATION VALUE CALCULATION UNIT, 225 . . . INFORMATION DETERMINATION UNIT, 226 . . . OUTPUT UNIT, 230 . . . MONITOR, 310 . . . DRILL BIT, 320 . . . PIPE, 330 . . . RUNNING WATER TANK, 340 . . . CIRCULATING PUMP, 350 . . . FLOW PATH, 360 . . . SUCTION, 500 . . . RECORDING MEDIUM, 510 . . . PROGRAM STORAGE AREA, 600 . . . RECEPTION PROGRAM, 610 . . . MAIN MODULE, 611 . . . STORAGE UNIT MODULE, 612 . . . WAVEFORM DETECTION MODULE, 613 . . . CORRELATION VALUE CALCULATION MODULE, 614 . . . CORRELATION VALUE CALCULATION MODULE, 615 . . . INFORMATION DETERMINATION MODULE, 616 . . . OUTPUT MODULE

The invention claimed is:

1. A transmission/reception system for transmitting and receiving data in drilling mud, comprising:
  a transmission apparatus that generates a pressure wave for transmitting a measured waveform comprising data in a liquid, comprising:
  a tubular member;
  a plurality of valves that are provided side by side in an axial direction of the tubular member inside the tubular member, each of which includes a stator including holes for passing the liquid, and a rotatable rotor which is provided to overlap the stator and includes blocking portions blocking the holes in the stator according to a rotation positon;
  drivers respectively coupled to the respective rotors of the valves to rotate the respective rotors; and
  a controller communicatively coupled to the drivers that controls each of the drivers so as to rotate and stop the respective rotors at frequencies different from each other, according to data to be transmitted; and
  a reception apparatus that extracts data from the liquid, comprising:
  a processor; and
  storage that stores information indicating a plurality of different reference waveforms and information in which a set of reference correlation values indicating reference correlations of the number of the different reference waveforms and data to be extracted are associated,
  wherein the processor is configured to:
  detect the measured waveform by detecting the pressures generated in the liquid in time series;
  calculate a first correlation value indicating a correlation between the detected measured waveform and each of the plurality of different reference waveforms indicated by the stored data;
  calculate a second correlation value indicating a correlation between a set of the calculated first correlation values and a set of the reference correlation values indicated by the stored data;
  determine data to be extracted from the detected measured waveform, from the second correlation value, and the data to be extracted and the set of the reference correlation values stored by the storage; and
  output the determined data.

* * * * *